United States Patent
Akami et al.

[11] Patent Number: 5,949,683
[45] Date of Patent: Sep. 7, 1999

[54] ROBOT CONTROL APPARATUS

[75] Inventors: Yusuke Akami, Yokohama; Noriaki Saisaka, Tokyo; Tatsuya Rembutsu, Kawasaki, all of Japan

[73] Assignee: Tokico Ltd., Kawasaki, Japan

[21] Appl. No.: 08/573,951

[22] Filed: Dec. 19, 1995

[30] Foreign Application Priority Data

Dec. 20, 1994 [JP] Japan ..... 6-317312
Jan. 20, 1995 [JP] Japan ..... 7-007722
Jan. 20, 1995 [JP] Japan ..... 7-007723

[51] Int. Cl.$^6$ ............. G06F 19/00; G05B 19/04
[52] U.S. Cl. ............. 364/469.02; 395/85; 395/89; 901/1; 901/3
[58] Field of Search ............. 901/41, 43, 42, 901/47; 118/675, 712; 395/80, 99, 85, 92, 89, 88; 364/469.02

[56] References Cited

U.S. PATENT DOCUMENTS 5,136,223  8/1992  Karakama et al. ..... 318/573
5,265,194  11/1993  Kanamori ..... 395/89
5,341,458  8/1994  Kaneko et al. ..... 395/90
5,582,750  12/1996  Hamura et al. ..... 901/42

FOREIGN PATENT DOCUMENTS 9426474  11/1994  WIPO ..... 901/42

*Primary Examiner*—David A. Simmons
*Assistant Examiner*—Calvin Padgett
*Attorney, Agent, or Firm*—Pillsbury Madison & Sutro LLP

[57] ABSTRACT

A robot control apparatus does not require an expert to perform programming, prepare teaching data or reprogram the motions of a work robot. The controller for the robot accepts the teaching point instructed by a beginner operator, and computes the start and end points in a track from the input teaching points. The controller also computes target start and end points in each of the passes in the track based on the current track points and the overspray width input by the operator and automatically allows for the overspray width. The control apparatus therefore facilitates operation of painting tasks which conventionally required a labor-intensive effort in reprogramming by an expert operator.

11 Claims, 23 Drawing Sheets

FIG.3

| ADDRESS | CORRECTION VALUES |
|---|---|
| 0 | VALUE FOR START POINT OF PAS1 |
| 1 | VALUE FOR END POINT OF PAS1 |
| 2 | VALUE FOR START POINT OF PAS2 |
| 3 | VALUE FOR END POINT OF PAS2 |
| 4 | VALUE FOR START POINT OF PAS3 |
| ⋮ | ⋮ |
| N | |

| POINT No. | VALUES FOR POSITION CORRECTION $\Delta PS (\Delta x, \Delta y, \Delta z \cdots)$ | i/o DATA |
|---|---|---|
| . | . | . |
| . | . | . |
| . | . | . |
| POINT No. | VALUES FOR POSITION CORRECTION | i/o DATA |
| VALUES FOR SPEED CORRECTION $\Delta v$ | | |

FIG.26

| | | | |
|---|---|---|---|
| PS1 | POSITION DATA (x1, y1, z1, ...) | SPEED v1 | TRACK GENERATION DATA | i/o DATA |
| PS2 | POSITION DATA (x2, y2, z2, ...) | SPEED v2 | TRACK GENERATION DATA | i/o DATA |
| ... | ... | ... | ... | ... |
| PSn | POSITION DATA (xn, yn, zn, ...) | SPEED vn | TRACK GENERATION DATA | i/o DATA |

FIG.27
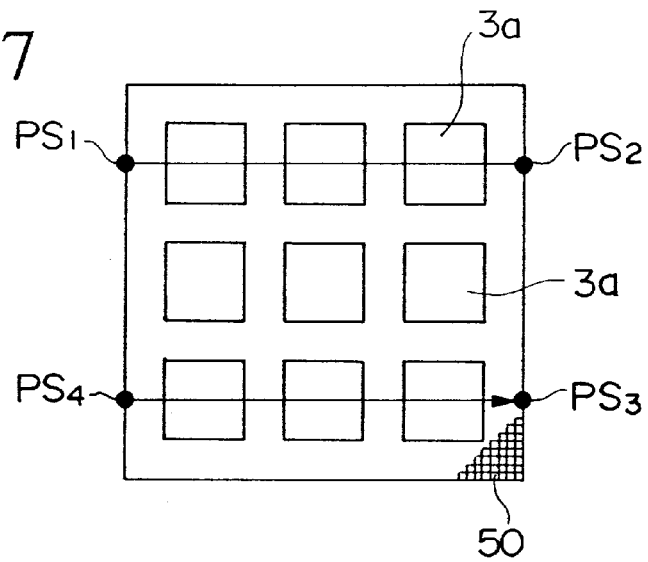
FIG.28
| POSITION DATA PS1 | |  |
|---|---|---|
| POSITION DATA PS2 | |  |
| POSITION DATA PS3 | |  |
| POSITION DATA PS4 | |  |
| SPEED v | NUMBER OF PASS M | — |
FIG.29
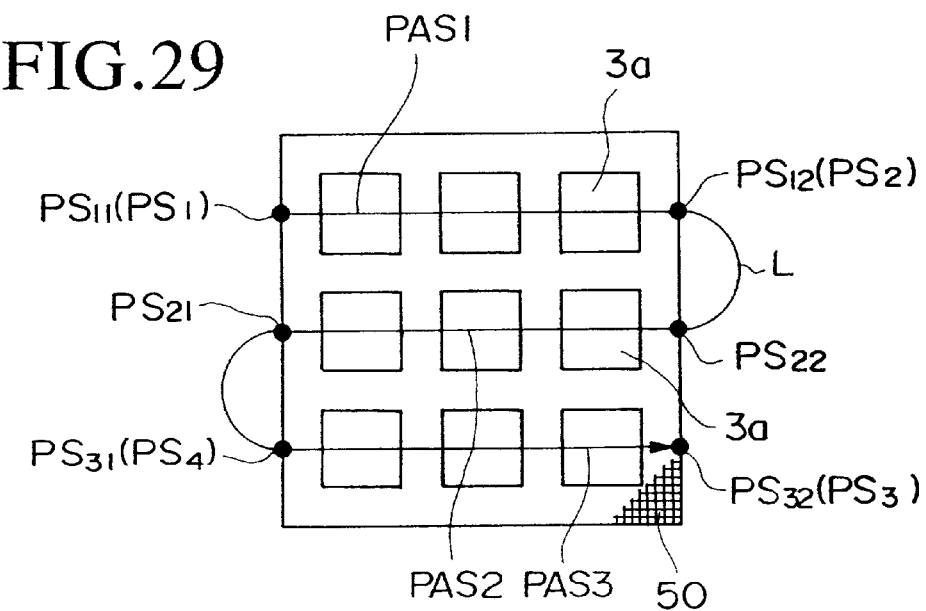

ROBOT CONTROL APPARATUS

BACKGROUND OF THE INVENTION

1. Field of the Invention

The present invention relates to a robot control apparatus for teaching and controlling the operation a teaching-playback type robot.

2. Description of Related Art (1) Difficulty of Programming

An example of the conventional type of teaching-playback robot is a paint-gun robot which follows an S-shaped tack according to teaching data (program) to carry out a painting task. To program the painting robot for the painting task, an operator must allow for the so-called overspray width of an object at the end of a paint pass in which the return travel tends to produce a heavy deposit of paint if the turn-around point is chosen at the edge of the workpiece. This problem is usually corrected by displacing the turn-around point slightly away from the edge.

In some robotic painting devices, the overspray width is allowed for in the program as a stored constant which forms a basis of painting instructions to the painting robot.

In these conventional robotic painting devices, if the overspray width allowance is made large, the required motion range is often beyond the motion capability range of the robot, leading to a problem of frequent shut-down of the painting facility. If the allowance is made too small, paint drips tend to be produced near the turn-around spot.

For these reasons, it has been difficult for a beginner to choose a proper value of overspray width, and experts are often needed to prepare appropriate teaching data, thus presenting a problem of inflexibility in manpower usage.

Furthermore, for each change in painting speed, it was necessary to readjust the overspray allowance to accommodate the new speed, thus presenting a problem of time-consuming programming.

(2) Difficulty of Reprogramming

Preparation of teaching data for conventional industrial robots to handle complex shaped workpieces are based on teaching the fine details of the features (points) of the work track, and memorizing such information as the position of each point (coordinates) and the paint track generation data in the memory by means of a central command post. When the teaching data are to be altered, changes are made to the positional data of the points and many other data. In the following, the above method of teaching by the central command of the robotic device is referred to as the multi-point teaching method.

The multi-point teaching method applied to a painting robot will be explained with reference to FIGS. 24 to 26. FIG. 24 shows an arrangement of workpieces 3a (target pieces) of a rectangular shape placed on a metal screen 50 disposed on a work platform 3. Using a painting robot (not shown) which has been instructed by the multipoint method, the workpieces 3a are painted by a painting gun (not shown) disposed at a distance h from the workpieces 3a and moving along a S-shaped track L as illustrated in FIG. 24.

The operator, from a control panel (not shown), teaches the robot successive points PS1 to PS6 along the track L shown in FIG. 25. The controller then commands an internal memory unit to memorize the positional data of each of the points PS1~PS6 in a configuration as shown in FIG. 26, for example. The operator then enters, through the control panel, track generation data (speed, positioning between points and interpolation etc), and paint gun on/off data and other input/output data (i/o data) for the operational control of the painting robot to be memorized in the internal memory unit for each of the points PS1~PS6 as shown in FIG. 26. In FIG. 26, "n" is the number of points which is 6 in this case. Painting is performed on the workpieces $3a$ between a pass such as between point PAS1~PAS2, PAS3~PAS4 and PAS5~PAS6 arranged on the track L.

Although the preparation of teaching data according to the multipoint teaching method illustrated above has an advantage that a workpiece of a complex shape can be handled through a control panel, even for a relatively simple task illustrated in FIG. 24 requires teaching of many successive points. As the number of passes increases, the number of points to be memorized also increases, correspondingly increasing the requirements for memory units (manifested in the number of floppy disks FD for example). This presented a problem that many FD must be prepared with labor-intensive programming effort.

To resolve such problems caused by the labor-intensive nature of the multipoint method, a four-point teaching method has recently come to be utilized. With reference to FIG. 27, the four-point teaching method will be explained below.

Briefly, the basic working area is defined as a rectangular surface composed of four points PS1~PS4 as shown in FIG. 27, and the operator enters positional data in the robot controller (controller hereinbelow) for the successive points PS1 to PS4 as well as the number of passes to be made. The robot then computes the work track necessary to carry out the task automatically. This will be further explained below.

In more detail, when the operator enters the positional data successively from PS1 to PS4 into the controller, which memorizes the positional data in its memory unit as shown in FIG. 28. The operator then enters speed v, number of passes M through the control panel, and the controller memorizes the data in its memory unit as shown in FIG. 28. From the input data, the controller automatically computes the track necessary to carry out the task within the work range.

The method of computation is as follows. The number of passes required is designated by M having each pass labelled as m (where m=1~M), then the start point and the end point are given by equations 1 and 2 below.

$$PSm1=PS1+(m-1)\ (PS4-PS1)/(M-1) \qquad (1)$$

$$PSm2=PS2+(m-1)\ (PS3-PS2)/(M-1) \qquad (2)$$

If the number of passes M is set to 3, the start point for the PAS1~PAS3 (points PS11, PS21, PS31) and the end point (points PS12, PS22, PS32) are given by setting M=3 and successively substituting 1~3 for the value of m in equations 1 and 2. That is, $$PS11=PS1+0\ (PS4-PS1)/2=PS1$$

$$PS12=PS2+0\ (PS3-PS2)/2=PS2$$

$$PS21=PS1+1\ (PS4-PS1)/2=PS1$$

$$PS22=PS2+1\ (PS3-PS2)/2$$

$$PS31=PS1+2\ (PS4-PS1)/2=PS4$$

$$PS32=PS2+0\ (PS3-PS2)/2=PS3$$

The data preparation by the four-point teaching method has an advantage that the amount of data which must be stored in the internal memory of the controller is relatively small and the consumption of FD is correspondingly less and that the number of teaching steps required by the operator is also less. However, when a painting task is actually carried out using the data prepared by the four-point method, there are instances of uneven painting, caused by such factors as minute misalignment in the positional data. When this problem occurs, it is necessary to readjust the positional data of the points, but the four-point method has a disadvantage that it lack the ability to adjust positional data individually for each track point. Therefore, the method is incapable of improving the painting quality.

To resolve this deficiency in the four-point method, there is an alternative method called amendable four-point method. This method will be explained below.

Data preparation by the amendable four-point method follows the basic steps of the four-point method explained above, but the data are arranged differently in the memory. After obtaining all of the positional data by the use of equations 1 and 2 (the points PS11~PS32 for the case shown in FIG. 29) together with the operational data such as speed and the track generation data, the data are stored in the same format as the multipoint method shown in FIG. 26. This type of memory format allows point corrections while maintaining the simple methodology of the amendable four-point method.

However, although the method of data preparation by the amendable four-point method facilitated the teaching steps and offered an ability to correct point data, the approach of entering the data through the control panel of a robot still left an unresolved problem of high memory consumption.

(3) Difficulty of Reviewing and Real-Time-Reprogramming

FIG. 30 is a perspective illustration of a painting task carried out on workpiece 3a by the tip of a paint gun 2 moving along a track (painting track hereinbelow).

The paint gun 2 moves in an X-Y plane from point PT1 to PT2 while spraying paint on workpieces 3a disposed on a rectangular metal screen 50. Spraying is stopped while the paint gun 2 moves from PT2 to PT3. The same sequence, i.e. spraying paint only when moving in the X-direction, is repeated to complete the move from PT3 to PT8 along the track shown in FIG. 30. The process of track generation of the movement of the tip of the paint gun 2, referred to as the tip trace, shown in FIG. 30 by the four-point method will be explained below.

The operator sets the operational mode of the controller to the teaching mode using a teaching pendant (not shown) and teaches the positional data of the corners A~D of the metal screen 50 and the standby position PT0 of the tip of the paint gun 2 when the robot assumes a standby stance. (The corners A~D and the standby position PT0 are referred to as teaching point hereinbelow.) More specifically, the operator, with the use of the keys provided on the teaching pendant such as the coordinate designation by the X-key, Y-key, Z-key, together with a plus-key, a minus-key for the directional data, actually moves the tip of the paint gun to the corner positions A~D and the standby position PT0, and presses the define-key to input the coordinates of the points.

Next, the operator, again with the use of the teaching pendant, specifies the painting conditions such as moving speed of the paint gun 2, the number of tracks in the X-direction shown in FIG. 30, which is the pass, overspray width W, volume of spray of the paint, reproduction-start timing and others. Entering of the name of the teaching data prompts the controller to complete the teaching data based on the input data.

When programming is completed, the operator sets the operational mode of the controller to reproduction mode to reproduce the teaching data so as to make the robot 1 actually carry out the painting operation. The operator checks to confirm the operational parameters such as painting track, the volume of paint deposited on the workpiece 3a and uniformity and the like quality of the workpiece, and if there are no problems, the operator completes the programming task.

However, it is rare that one teaching is sufficient to achieve the end results that are intended by the operator, and frequently, there are problems in proper defining of the points, as well as slight mismatching in setting operational parameters such as the separation distance between the tip of the paint gun 2 to the workpiece 3a and the width W of overspray (refer to FIG. 30) resulting in problems in painting track and the painting quality. When such problems arise, the operator must again set the operational mode of the controller to the teaching mode to repeat the teaching task, including teaching of points and resetting of the painting parameters.

Therefore, it is usual that the process of "teaching reproduction of teaching data reteaching to correct teaching data" is repeated many times before a satisfactory product quality can be achieved.

It is therefore necessary to allow for such repeat process of teaching and correction process to be a norm in any operating environment in the conventional system.

The corrections process requires the operator to undertake cumbersome steps of switching the mode, saving, selecting and reading-in of teaching data as well as checking or adjusting of standby position PT0 and the moving speed of the paint gun 2.

The result is that the operator is subjected to numerous chances for making errors while carrying out corrections in the teaching data, such as loss of data and erroneous entries, because of the sheer number of repetitive steps which must be checked and rechecked.

A further serious problem in the conventional robotic painting systems using the robot control panel is that there is no provision for performing real-time-correction of the teaching data while observing the action of the manipulator during the program reproduction phase. Therefore, it is difficult for the operator to relate the current positional data requiring the corrections to the exact coordinates on the actual track. Furthermore, when the manipulator is being activated in an assembly line, the entire line has to be stopped to reprogram the robotic device.

SUMMARY OF THE INVENTION

It is an object of the present invention to present a robot control apparatus which does not require expertise so that even a beginner can prepare, or program, teaching data for the robot control apparatus to control working motions of a robot.

It is another object of the present invention to present a robot control apparatus which allows reprogramming of track points on a working track in a simple manner, and which does not require large amounts of memory capacity.

It is yet another object of the present invention to present a robot control apparatus which enables reprogramming teaching points in real-time while the teaching data are being reproduced without stopping the motions of the robot.

These objects have been achieved in a robot control apparatus comprising: overspray width setting means for setting an overspray width; track point computation means for computing track points, allowing for the overspray width, distributed on a work track of the painting device; and overspray width correction means for correcting the overspray width in relation to painting conditions.

The salient features of the basic robot control apparatus presented above are summarized.

The basic apparatus facilitates programming of a painting robot, taken as an example, by a beginner operator because the overspray width is established by an overspray width setting device, and the computation of the track points are made by the track point computation device based on the overspray width input from the overspray width setting device, and the overspray width correction device then automatically changes the overspray width in accordance with the painting conditions prevailing at that time.

An aspect of the robot control apparatus is that the apparatus is provided with painting speed altering means for altering a painting speed of the painting device, and the overspray width setting means is provided with means for changing the overspray width automatically in accordance with a change in the painting speed effected by the painting speed altering means.

Another aspect of the robot control apparatus is that the apparatus is provided with work track altering means for altering a work track, and the overspray width setting means is provided with means for changing the overspray width automatically in accordance with a change in the work track effected by the work track altering means.

The basic form of the robot control apparatus may be modified to comprise: memory means for storing a plurality of coordinate data for defining teaching points arranged within a capacity range of movement of the work tool; track points data computation means for computing a plurality of track points in accordance with the coordinate data surrounding a work range; correction data computation means for computing values of distance corrections, when corrections in track point data are requested, by calculating a difference in distance between a current track point and a target track point, and memorizing the difference as correction data in memory means; and target track point data computation means for computing target track point data on a basis of the correction data and the current track point data.

The ease of use of the basic robot control apparatus is enhanced by additional features presented above to perform any type of work in general. These modifications allow simple and quick correction of track point data without any danger of making erroneous entries, because all the required coordinates of the track points data are computed by the track points data computation device, the values of any corrections required are computed by the correction data computation device and the results are memorized, and the target track points are computed on the basis of the correction data.

The consumption of memory capacity is lowered in the modified control apparatus because it is only necessary to store corrections data and there is no need to store data for the entire passes in the tracks when it is desired to change the current track points to the target track points specified by the operator.

An aspect of the modified robot control apparatus is that teaching of the plurality of teaching points is performed by a four-point method.

An aspect of the modified robot control apparatus is that the correction data computation means store each of the correction data together with an identity number assigned to the target track point in memory means, and target track point data computation means correct a track point specified by the identity number with correction data matching the identity number.

The modified robot control apparatus presented above includes teaching data generation means for generating teaching data for robotic means; memory means for storing the teaching data; control means for controlling motions of the robotic means in accordance with the teaching data; instruction means for instructing corrections for the teaching data; and teaching data correction means for correcting the teaching data stored in the memory means while the control means control motions of the robotic means in accordance with instructions generated by the instruction means.

The additional features presented above further enhances the performance of the robotic device, because the production in an assembly line does not need to be shut down to make corrections in the teaching data. Correction in the teaching data can be carried out while the control device is controlling the motions of the robot according to the original teaching data. The arrangement also reduces the number of instruction steps required for reprogramming the robot.

The number of steps required for reprogramming has also been reduced to reduce the chances for a runaway of the robotic device.

An aspect of the modified robot control apparatus is that the control means control the robotic means so that a specific component of the robotic means successively moves through a plurality of track defining points defined by coordinate points in a specified order; the instruction means specifies a current track point and a target track point; and the teaching data correction means alter coordinate data of the current track defining point to coordinate data of the target track defining point while the control means control motions of the robotic means.

Another aspect of the modified robot control apparatus is that the instruction means specify a moving speed of the specific component of the robotic means, the teaching data correction means correct the moving speed in accordance with instruction data generated by the instruction means while the control means control motions of the robotic means.

Another aspect of the modified robot control apparatus is that the instruction means specify a quantity of a task performed by the robotic means, the teaching data correction means correct the quantity of the task in accordance with the instruction data while the control means control motions of the robotic means.

The final aspect of the basic robot control apparatus of the present invention is that the teaching data comprise a data element, for each of the track defining points, to identify one data element selected from a group consisting of coordinate data of the track defining points, the moving speed when the specific component of the robotic means is passing the track defining point and the quantity of a task; the instruction means specify the plurality of track defining points, the data element and corrections for the data element; and the teaching data correction means simultaneously alter the data element to the correction data for each of the plurality of track defining points.

Taking all the various aspects of the basic robot control apparatus into consideration, it is evident that the programming steps for the robotic device have been fully automated to eliminate nearly all the conceivable chances for making erroneous entries by the operator. Many examples of programming a robotic device has been presented to demonstrate that the robot control apparatus of the present invention has achieved all the objects set forth at the beginning, i.e., expertise is not required in programming and even a beginner is able to prepare teaching data; track points can be reprogrammed in a simple manner requiring minimal amounts of memory capacity; and teaching point can be reprogrammed in real-time during reproduction of the teaching data without stopping the motions of the robot.

BRIEF DESCRIPTION OF THE DRAWINGS

FIG. 3 is a pass data corrections table showing the correction values for start/end points in each pass in the first embodiment.

FIG. 26 is an example of arrangement of data in the memory table of a conventional multipoint teaching method.

FIG. 27 is an illustration of teaching data preparation according to the four-point method using the conventional robot control device.

FIG. 28 is an example of arrangement of data in the table memory of a conventional four-point teaching method.

FIG. 29 is an illustration of teaching data preparation according to the conventional four-point method.

DESCRIPTION OF THE PREFERRED EMBODIMENTS

Embodiment 1

The first embodiment will be explained with reference to FIGS. 1 to 11.

Figure 1:
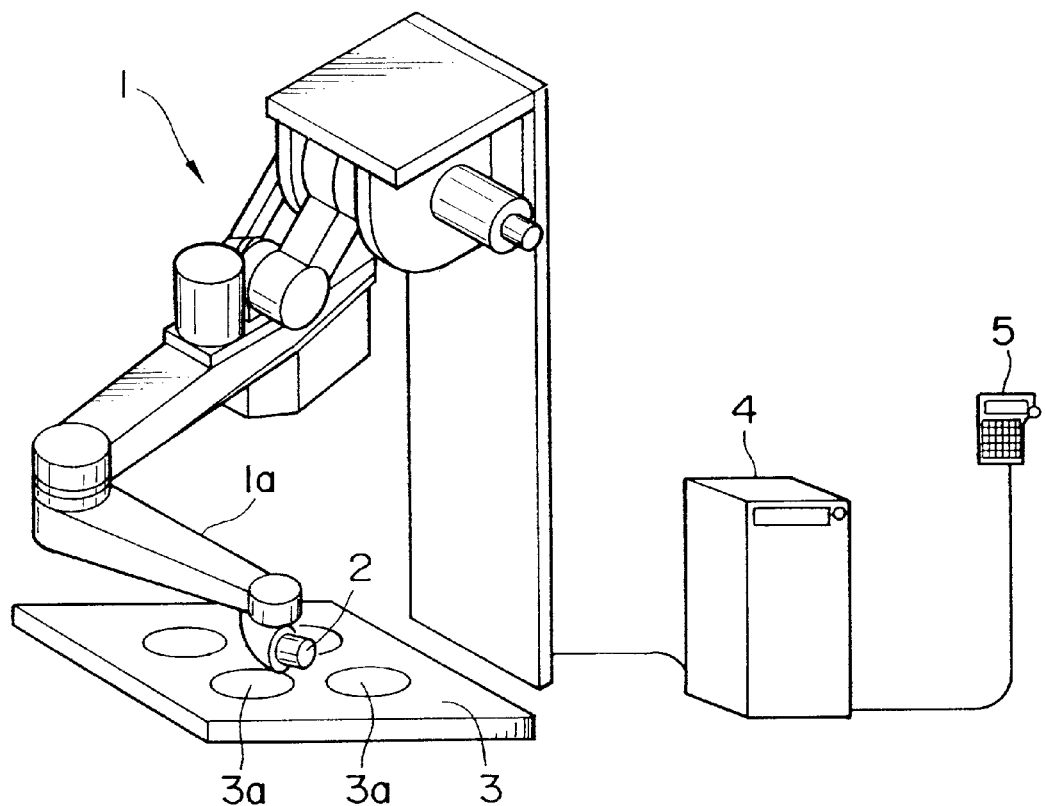
FIG. 1 is a perspective schematic view of a first embodiment of the painting robot having the robot control device of the present invention.

FIG. 1 shows an external overall perspective view of a robot control apparatus of Embodiment 1. A robot 1 is a multijoint robot which performs painting jobs using an arm 1a driven by a motor (not shown in the drawing), by using a paint gun 2 provided at the tip of the arm 1a to spray paint on workpieces 3a. The workpieces 3a are placed on a work platform 3 disposed below the arm 1a. A controller 4 controls various motions of the robot 1, and is disposed in the vicinity of the robot 1. The controller 4 has a teaching pendant 5 provided with a number of function keys for managing the motions of the robot 1, including input/output of teaching data for the robot 1.

There are two methods for preparing teaching data using the robot control apparatus: a remote teaching method; and a numerical teaching method. The remote teaching method is based on obtaining the input data by placing the workpieces 3a on the work platform 3, and by operating the teaching pendant 5 to actually operate the robot. The numerical teaching method is based on inputting numerical coordinates of the track points for the positional data in the robot control 1.

Figure 2:
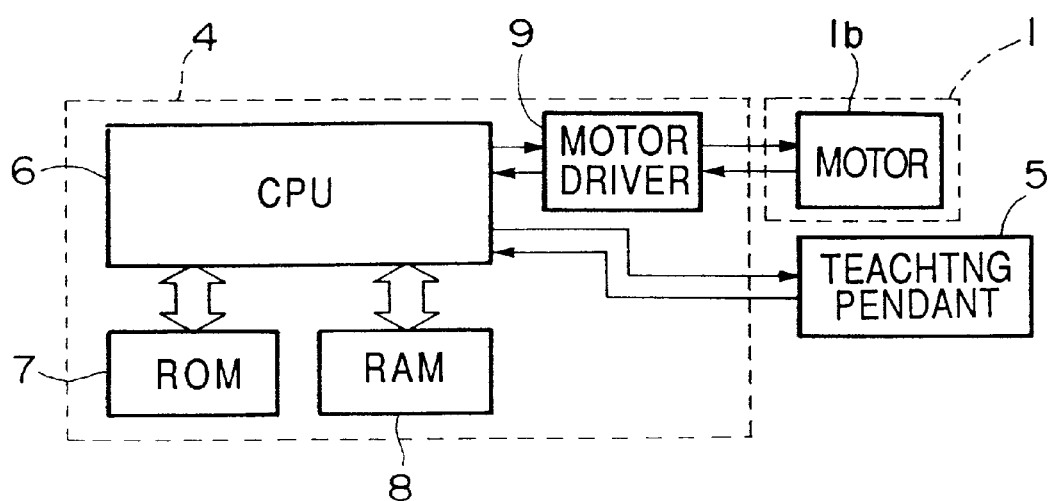
FIG. 2 is a block diagram of the electrical layout of the first embodiment.

FIG. 2 is a block circuit diagram of the robot control apparatus shown in FIG. 1. The controller 4 comprises: a central processor unit (CPU) 6; a read-only memory (ROM) 7; random-access memory (RAM) 8; and a motor driver 9.

The motor driver 9 stores positional data (coordinates) for the paint gun 2 as well as drives the motor 1b according to the motor control signals from CPU 6. The teaching pendant 5 is connected to CPU 6, and is used to supply signals input through the keyboard by the operator to CPU 6.

CPU 6 controls various computational tasks such as preparation of teaching data and control of various components of the apparatus. RAM 8 memorizes positional data and operational parameters for spray painting, and includes a screen-track table, a pass data corrections table, and an overspray data table allowing for the width of the overspray.

The screen-track memory table stores data for the start point and the end point for the screen-track Gm (to be explained later), the pass data corrections table stores the correction distance required for the screen-track Gm and the overspray data table stores the data for the start points and the end points for the screen-track Tm (to be described later). Procedures for the pass-correction and start/end point corrections will be described later.

FIG. 3 shows an example of the pass data corrections table. The table contains the correction distance for each of the passes from 0 to N.

As shown in FIG. 2, motor driver 9 drives motor 1b according to the motor control data provided by CPU 6 and witholds the position data of the paint gun driven by the motor 1b. Teaching pendant 5 is in communication with CPU 6 and outputs thereto, when the keys are pressed by the operator, the signals responsive to the keys which have been pressed.

The teaching methodology used by the operator will be explained with reference to FIG. 4. The operation of CPU 6 while the robot is being programmed by the operator will be explained later. It should be noted that reference is made to various function keys on the teaching pendant 5 but the actual keys on the teaching pendant 5 are not illustrated in the drawings.

In step SA1, the power is turned on to the apparatus by the operator, and after supplying power to the robot 1 and the controller 4, the operator proceeds to step SA2.

In step SA2, the operator selects either start teaching or end teaching. When teaching is required, the controller 4 proceeds to step SA4, and when teaching is not required, proceeds to step SA3 to end the teaching session.

Figure 5:
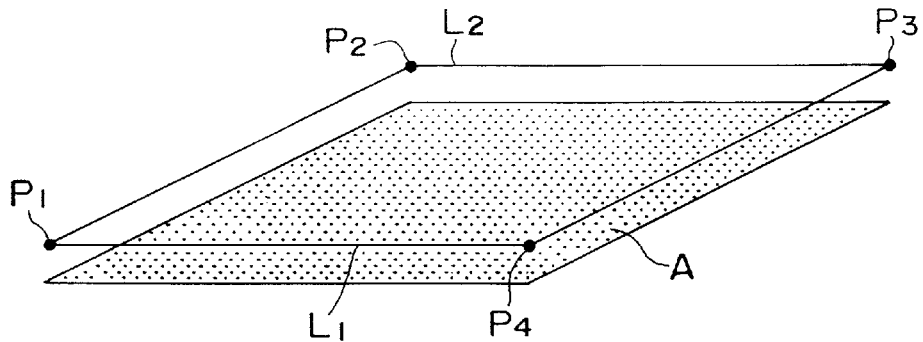
FIG. 5 is an illustration of the four-point teaching method in the first embodiment.

In step SA4, the operator teaches the successive teaching points P1~P4 which are located directly above the corner positions of the painting range A of a square shape, for example, as shown in FIG. 5. The teaching may be carried out by either the remote teaching method or the numerical teaching method discussed earlier. In the remote teaching method, the paint gun 2 is actually positioned successively above each of the teaching points P1~P4 so that the controller 4 can read and store the coordinates, and in the numerical teaching method, the actual numerical coordinates of the teaching points P1~P4 are input by the operator.

The remote teaching method will be explained in this embodiment. First, the operator moves the paint gun 2 to the teaching point P1 by means of the move key on the keyboard of the teaching pendant 5. After the paint gun 2 arrives at P1, the operator presses the teaching key of the teaching pendant to enter the coordinates of the teaching point P1 into CPU 6. The same teaching steps are repeated for the teaching points P2 to P4 successively, and proceeds to step SA5.

Figure 6:
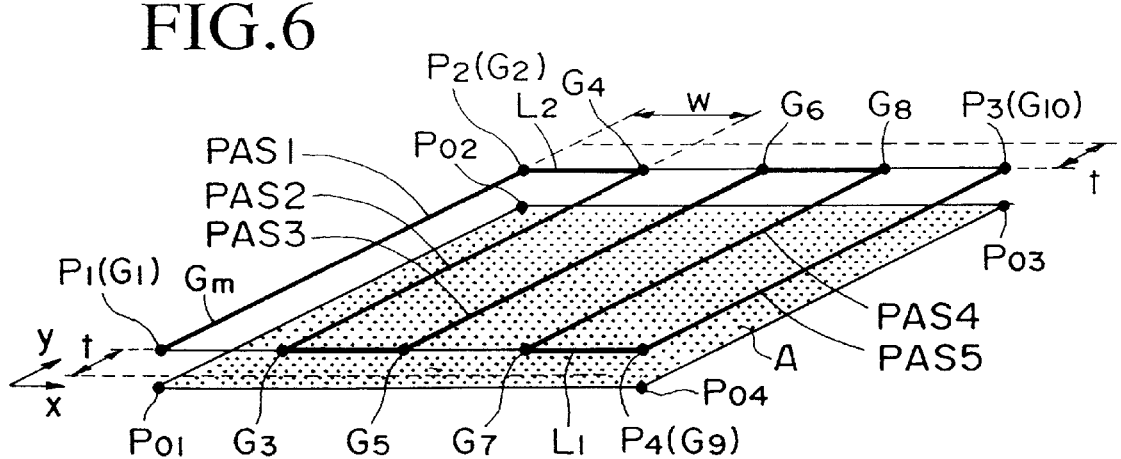
FIG. 6 is an illustration of pass correction in the screen-track Gm in the first embodiment.

In step SA5, after the operator has input the value of painting pitch w by means of the teaching pendant 5, the controller 4 proceeds to step SA6. The painting pitch w is shown in FIG. 5 and refers to a spacing constant for dividing a line L1, for example, joining the teaching point P1 with the teaching point P4 or a line L2 joining the teaching point P2 and another teaching point P3. CPU6 then divides line L1 into points G1, G3, G5, G7 and G9 in accordance with spacing constant w and the teaching points P1~P4, as shown in FIG. 6, and similarly line L2 is divided into points G2, G4, G6, G8 and G10. The screen track Gm mentioned earlier refers to the tracks joining the points G1~G10. In the screen track Gm, the line joining the points between G1 and G2 is the pass PAS1, and similarly pass PAS2 is the line joining G3 and G4, and pass PAS5 is the line joining G9 and G10. The points G1 to G9 on line 1 define the start points and the points G2 to G10 on line 2 define the end points for each of the passes PAS1 to PAS5.

Figure 4:
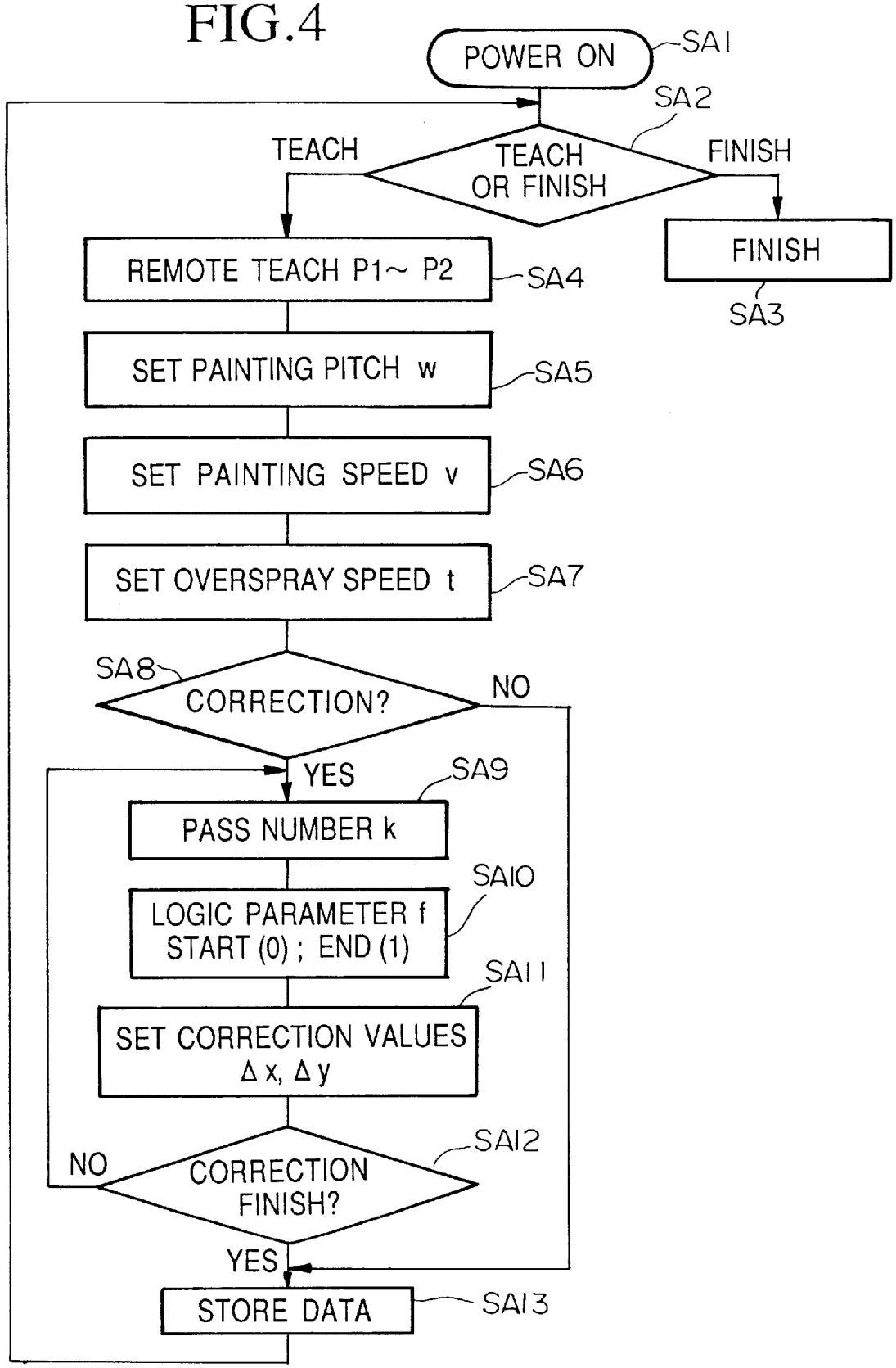
FIG. 4 is a flowchart showing the teaching steps for the operator in the first embodiment.

Proceeding to step SA6 in FIG. 4, the operator inputs a value of the painting speed v of the paint gun 2 from the teaching pendant 5, and proceeds to step SA7.

Figure 7:
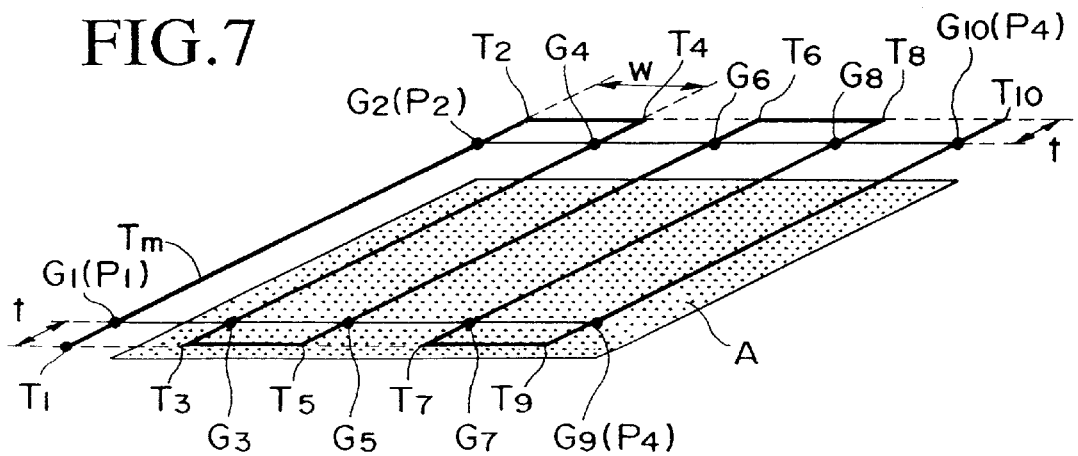
FIG. 7 is an illustration of the pass correction in the screen-tack Tm in the first embodiment.

In step SA7, the operator enters a value of overspray width t from the teaching pendant 5, and proceeds to step SA8. The overspray width t refers to an extra pass distance of the paint gun 2 by moving the current start points G1~G9 and the current end points G2~G10 outwardly to enlarge the painting range A, as shown in FIG. 6. After moving the current start/end points of the passes in the screen track Gm by a distance corresponding to the overspray width t as shown in FIG. 7, CPU 6 computes the target start points T1~T9 and target end points T2~T10. The lines joining the target start points T1~T9 and the target end points T2~T10 are the screen track Tm which was mentioned earlier. When the workpieces 3a are to be painted, the paint gun 2 moves along the screen tracks Tm while spraying paint.

In step SA8, the operator decides whether the pass needs to be corrected. The correction of pass refers to the process of moving the start/end points on the screen track Gm to correct the lengths of the passes. If the decision in step SA8 is NO (i.e. no correction in the pass lengths), then the operator presses the pass data finish key on the teaching pendant 5, and proceeds to step SA13.

In step SA13, the operator presses the data storage key on the teaching pendant 5 to store the target start/end points T1~T9, T2~T10, respectively, in the overspray data table in RAM 8, then returns to step SA2.

In the meantime in step SA8, if the decision is YES, i.e., corrections are required, the operator presses the pass data correction key on the teaching pendant 5, then proceeds to step SA9.

In step SA9, the operator specifies the location of the pass which needs to be corrected by entering pass parameter k (for example, if the pass to be corrected in pass PAS1, then k=1) from the teaching pendant 5, and proceeds to step SA10.

In step SA10, the display screen on the teaching pendant 5 displays "start point" and "end point". The start point in this case is the start point for the pass specified by the pass number k, and the end point is the corresponding end point for the same pass number k. The operator chooses the appropriate start/end points, and proceeds to step SA11.

In step SA11, the operator specifies the distance correction x for the start or end point in the x-direction and the distance correction y for the start or end point in the y-direction selected in step SA10, and enters the respective distance corrections x and y through the teaching pendant 5. The operator then proceeds to step SA12.

In step SA12, the operator decides whether to end the process of correcting the pass distance, and if the decision is NO, i.e. if further corrections are needed, then the operator returns to step SA9. On the other hand, if the decision in step SA12 is YES, i.e. to end the correction process, then the operator proceeds to step SA13.

In step SA13, the operator presses the data storage key to store the start/end points on the screen track Tm in the overspray data table, and returns to step SA2.

The operation of CPU 6, responding to the operator's instruction of the teaching steps, will be explained with reference to a PAD chart shown in FIG. 8.

In step SB1, which follows the power-on event in step SA1 (refer to FIG. 4) which turns on the robot 1 and the controller 4, CPU 6 enters 0 in the counter parameter i, and proceeds to step SB2.

In step SB2, CPU 6 executes steps SB3~SB5 until the counter parameter turns to 4.

In step SB3, CPU 6 waits until the operator presses the robot moving key on the teaching pendant 5 to move the paint gun 2 to the teaching point P1. When the robot key is pressed (refer to FIG. 4, step SA4), an appropriate moving signal is forwarded to CPU 6 from the teaching pendant 5, CPU 6 recognizes that the robot moving key has been pressed, and proceeds to step SB4.

In step SB4, CPU 6 outputs a motor control signal to the motor driver 9, according to the robot moving signal supplied, which drives the motor 1b accordingly. The paint gun 2 is moved by the motor 1b and reaches the teaching point P1 shown in FIG. 5. After the paint gun 2 reaches the teaching point P1, the operator presses the teaching key on the teaching pendant 5 (refer to FIG. 4, step SA4) to forward an appropriate signal to CPU 6. After confirming that the teaching point P1 has been reached, CPU 6 proceeds to step SB5.

In step SB5, CPU 6 stores the coordinate data (x01, y01) of the teaching point P1 (x01, y01) supplied from the motor driver 9 in RAM 8, and returns to SB2.

In step SB2, CPU 6 adds 1 to the counter parameter i, and proceeds to step SB3. Henceforth, CPU 6 repeats the steps SB2~SB5 until the counter parameter i turns to 4. In this example, CPU 6 stores successive coordinate data of the teaching points P2(x02, y02), P3(x03, y03) and P4(x04, y04) in RAM 8, and proceeds to step SB6.

In step SB6, CPU 6 receives data for painting pitch w input by the operator from the teaching pendant 5 (refer to FIG. 4, step SA5). CPU 6 recognizes that the pitch data has been supplied, and stores the pitch data in RAM 8, and proceeds to step SB7.

In step SB7, CPU 6 receives data for painting speed v input by the operator from the teaching pendant 5 (refer to FIG. 4, step SA6). CPU 6 recognizes that the speed data has been supplied, and stores the speed data in RAM 8, and proceeds to step SB8.

In step SB8, CPU 6 receives data for overspray width t input by the operator from the teaching pendant 5 (refer to FIG. 4, step SA7). CPU 6 recognizes that the overspray width data has been supplied, and stores the overspray width data in RAM 8, and proceeds to step SB9.

In step SB9, CPU 6 reads out operating data and coordinate data (x01, y01)~(x04, y04), respectively, for painting pitch w and the teaching point P1~P4, and computes the start/end points for each pass along the screen track Gm.

Figure 9:
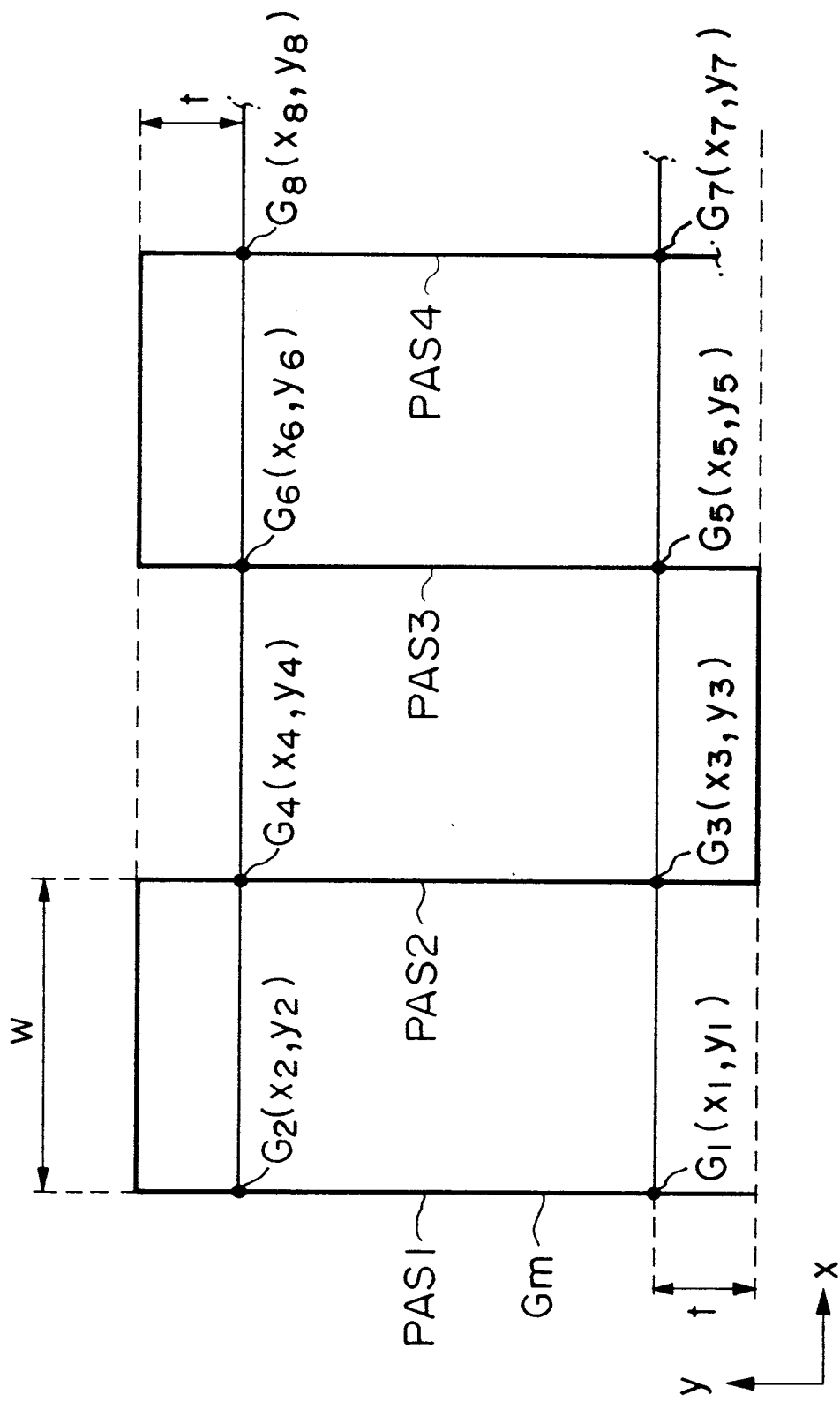
FIG. 9 is an illustration of the correction of screen-tack Gm in the first embodiment.

In this example, the above step provides the start points G1~G9 for the passes PAS1~5 and end points G2~G10 for the passes PAS2~10 for the screen track Gm. CPU 6 stores the start points G1~G9 for the passes PAS1~5 and end points G2~G10 for the passes PAS2~10 for the screen track Gm in the screen track table in RAM 8, then proceeds to step SB10. FIG. 9 shows the start/end points for the passes PAS1~4 of the screen track Gm in x, y coordinates. FIG. 9 omits showing pass PAS5 of the screen track Gm.

In step SB10, CPU 6 enters 1 in counter parameter i and repeats the steps SB11 until the counter parameter i becomes m which is twice the number of passes in the screen track Gm. In this example, there are five passes and the value of m=10. When a proper value of m is reached, CPU 6 proceeds to step SB11.

In step SB11, CPU 6 initializes the data in pass data corrections table in RAM 8 by inputting 0, and returns to step SB10 to add 1 to the counter parameter i. Henceforth, CPU 6 successively refreshes the memory contents until the counter parameter becomes 10, then proceeds to step SB12.

In step SB12, CPU 6 iterates the process in step SB9 until all the corrections of the start/end point of each pass in the screen track Gm are completed. Completing the process, CPU 6 proceeds to step SB13.

In step SB 13, CPU6 examines whether pass corrections are needed. Here, when the operator presses pass data correction key on the teaching pendant 5 (refer to FIG. 4, step SA8) an appropriate signal is forwarded to CPU6. CPU6 recognizes the signal to be YES, and proceeds to step SB 14.

If the decision in step SB13 is NO, CPU6 proceeds to step SB20, and ends the pass correction process.

In step SB14, CPU6 waits until the pass parameter k for the pass to be corrected is input. For example, if the start point G3(x3, y3) and end point (x4, y4) of the pass PAS2 shown in FIG. 9 are to be corrected to the start point G'3(x'3, y'3) and the end point G'4(x'4, y'4) shown in FIG. 10 (right bottom, and left top, respectively), the operator enters the pass number 2 for pass PAS2 from the teaching pendant 5, which supplies the pass number 2 to CPU6. CPU6 recognizes that the pass number has been input, and proceeds to step SB15.

In step SB15, CPU6 stores the pass number 2 in the pass parameter k in RAM8, then proceeds to step SB16.

In step SB16, the operator chooses one of either "start" or "end" displayed in the display section of the teaching pendant 5 (refer to FIG. 4, step SA10). When "start" is chosen, the teaching pendant 5 supplies the data to correspond to "0" to CPU6, and when "end" is chosen, the data to correspond to "1" is supplied to CPU6. In this example, the operator chooses "start" on the display so as to enable changing the start point G3(x3, y3) to G'3(x'3, y'3). The teaching pendant 5 supplies data to correspond to "0" to CPU6, which recognizes that the start point G3(x3, y3) of pass PAS2 is to be corrected, and proceeds to step SB17.

In step SB17, CPU6 stores 0 in the logic parameter f, then proceeds to step SB18.

In step SB18, CPU6 waits until the data specifying the distance corrections x, y of the start/end points of the passes in the x-, y-axis directions are input. In this example, the operator inputs the distance corrections x3, y3 respectively in the x-, y-axis directions for the start point G3(x3, y3) of pass PAS2 through the teaching pendant 5 (refer to FIG. 4, step SA11). The teaching pendant 5 then inputs data corresponding to the distances x3, y3 in CPU 6. CPU 6 recognizes that appropriate data have been input, and proceeds to step SB19.

In step SB19, CPU 6 computes the addresses from equation (3) shown below, for storing the distances x3 and y3 input in step SB18 by the operator, in the pass data corrections table (refer to FIG. 3) in RAM 8. After storing the data in the table, CPU 6 returns to step SB13.

$$F=2(k-1)+f \quad (3)$$

where k is the pass parameter stored in RAM 8 in step SB15, and f is a logic parameter stored in step SB17 in RAM 8, and is either "0" or "1".

In this example, CPU 6 enters 2 for k and 0 for f to compute the address2 for pass PAS2 and inputs the distance corrections x3, y3 for the start point G3(x3, y3) in the address2 of the pass data corrections table (refer to FIG. 3) in RAM 8, then returns to step SB13.

In step SB13, CPU 6 examines whether further pass corrections are being required. In this example, there is a remaining correction step for the end-points G4(x4, y4) to be corrected to G'4(x'4, y'4), therefore, the operator again presses the pass data correction key on the teaching pendant 5 in the same manner as described earlier. The decision result by CPU 6 then becomes YES, and CPU 6 proceeds to step SB14.

In step SB14, the operator then enters the pass number 2 for the pass PAS2 from the teaching pendant 5, and in step SB16, the operator selects "end" on the display screen of the teaching pendant 5, and in step SB18, enters the distance corrections x4, y4. In response in step SB19, CPU 6 inputs the end point G4(x4, y4) in the distance corrections x4, y4 of the end point G4(x4, y4) for the pass PAS2 in address3 of the pass data corrections table (refer to FIG. 3) in RAM 8, then returns to step SB13.

In step SB13, when the operator presses the pass data correction end key on the teaching pendant 5 which sends a signal corresponding to pass data end key to CPU 6. The decision result of step SB13 is thus NO, and CPU 6 decides that pass correction process is finished, and proceeds to step SB21.

In step SB21, CPU 6 enters 1 in the counter parameter i, and executes the steps SB22~23 until the value of i becomes m, i.e., m=10 in this example.

In step SB22, CPU 6 computes the start points for each of the passes on the screen track Tm from equation (4) below, and the end points for the passes from equation (5) below, based on the start/end points and the overspray width t for the screen track Gm, obtained in step SB9.

$$T_i(x_i+\Delta x_i+t\ b/a,\ y_i-\Delta y_i-t) \quad (4)$$

$$T(i+1)\ (x(i+1)-\Delta x(i+1)-t\ b/a,\ y(i+1)+\Delta y(i+1)+t) \quad (5)$$

where $$a=(y(i+1)+\Delta y(i+1))-(yi-\Delta yi) \quad (6)$$

$$b=(xi+\Delta xi)-(x(i+1)-\Delta x(i+1)) \quad (7)$$

Figure 10:
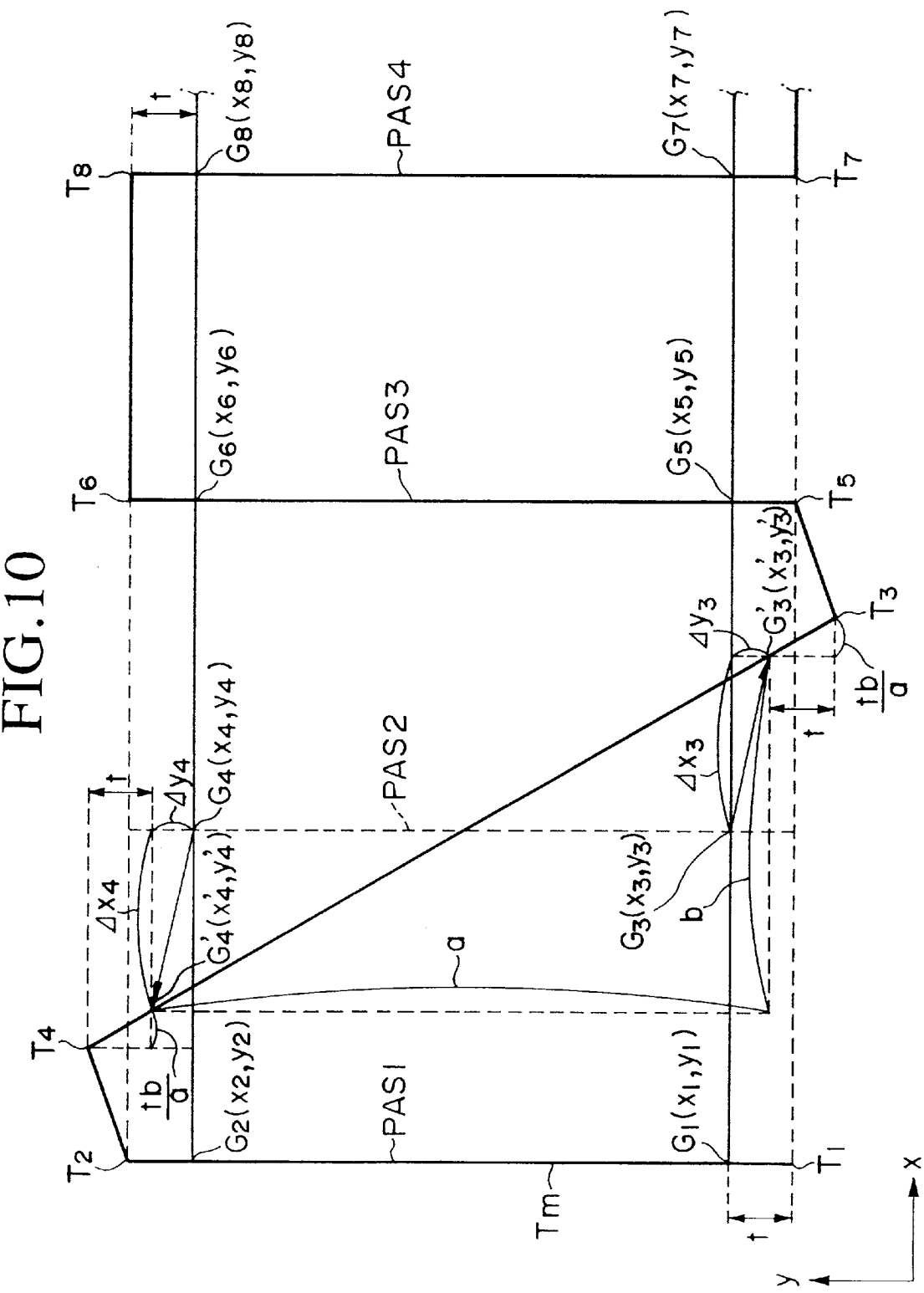
FIG. 10 is an illustration of the screen-tack Tm after pass correction in the first embodiment.

In this example, CPU 6 enters 1 successively in equations (4)~(7) as counter parameter i, and computes the start point T1 and the end point T2 of the pass PAS1 on the screen track Tm shown in FIG. 10 according to the following equations, $$T1(x1,\ y1-t)$$

$$T2(x2,\ y2+t)$$

and proceeds to step SB23.

In this example, since there is no correction of pass PAS1, therefore, $\Delta x1$, $\Delta x2$, $\Delta y1$ and $\Delta y2$ in equations (4)~(7) are 0, and a and b in equations (6) and (7) are both 0 because x1=x2 and y1=y2.

In step SB23, CPU 6 adds 2 to the counter parameter i, then returns to step SB22. In step SB22, CPU 6 enters 3 successively in the counter parameter i in equations (4)~(7), and computes the start/end points T3, T4 respectively, of the pass PAS2 on the screen track Tm according to the following equations.

$$T3(x3+\Delta x3+t\ b/a,\ y3-\Delta y3-t)$$

$$T4(x4-\Delta x4-t\ b/a,\ y4+\Delta y4+t)$$

where $$a=(y4+\Delta y4)-(y3-\Delta y3)$$

$$b=(x3+\Delta x3)-(x4-\Delta x4)$$

After completing the computation, CPU 6 proceeds to step SB23.

In step SB23, CPU 6 repeats the above process until all the start points (T5, T7, T9) and the end points (T6, T8, T10) of the passes PAS3~5 on the screen track Tm have been computed according to the following equations.

$$T5(x5,\ y5-t)$$

$$T6(x6,\ y6+t)$$

$$T7(x7,\ y7-t)$$

$$T8(x8,\ y8+t)$$

$$T9(x9,\ y9-t)$$

$$T10(x10,\ y10+t)$$

After completing the overspray computations, CPU 6 proceeds to step SB24.

In step SB24, CPU 6 stores the start/end points for each of the passes on the screen track Tm in the overspray data table in RAM 8. In this example, the start points T1~T9 and the end points T2~T10 for each of the passes PAS1~5 are stored in the overspray data table.

Figure 8:
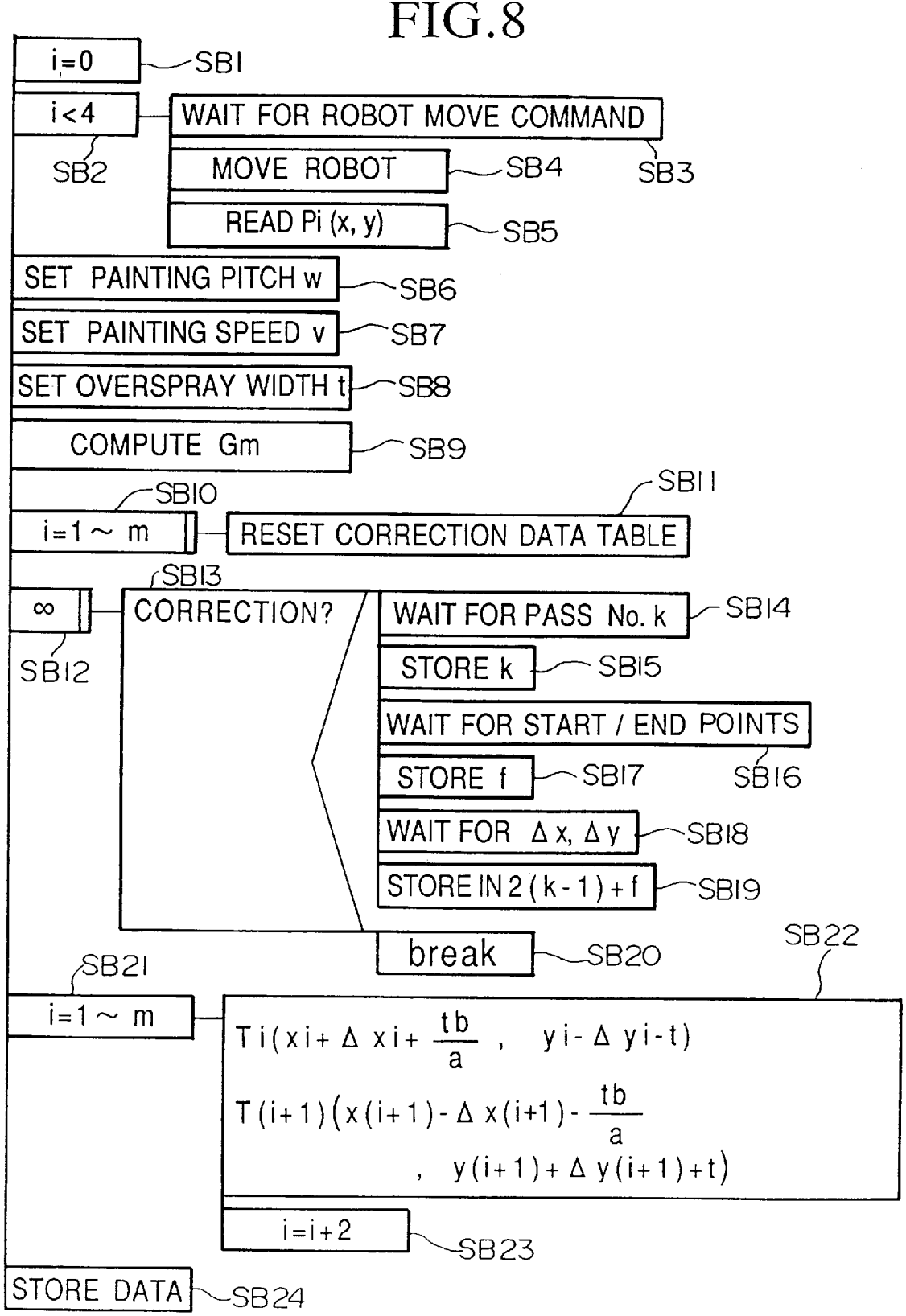
FIG. 8 is a PAD chart for CPU in the first embodiment.
Figure 11:
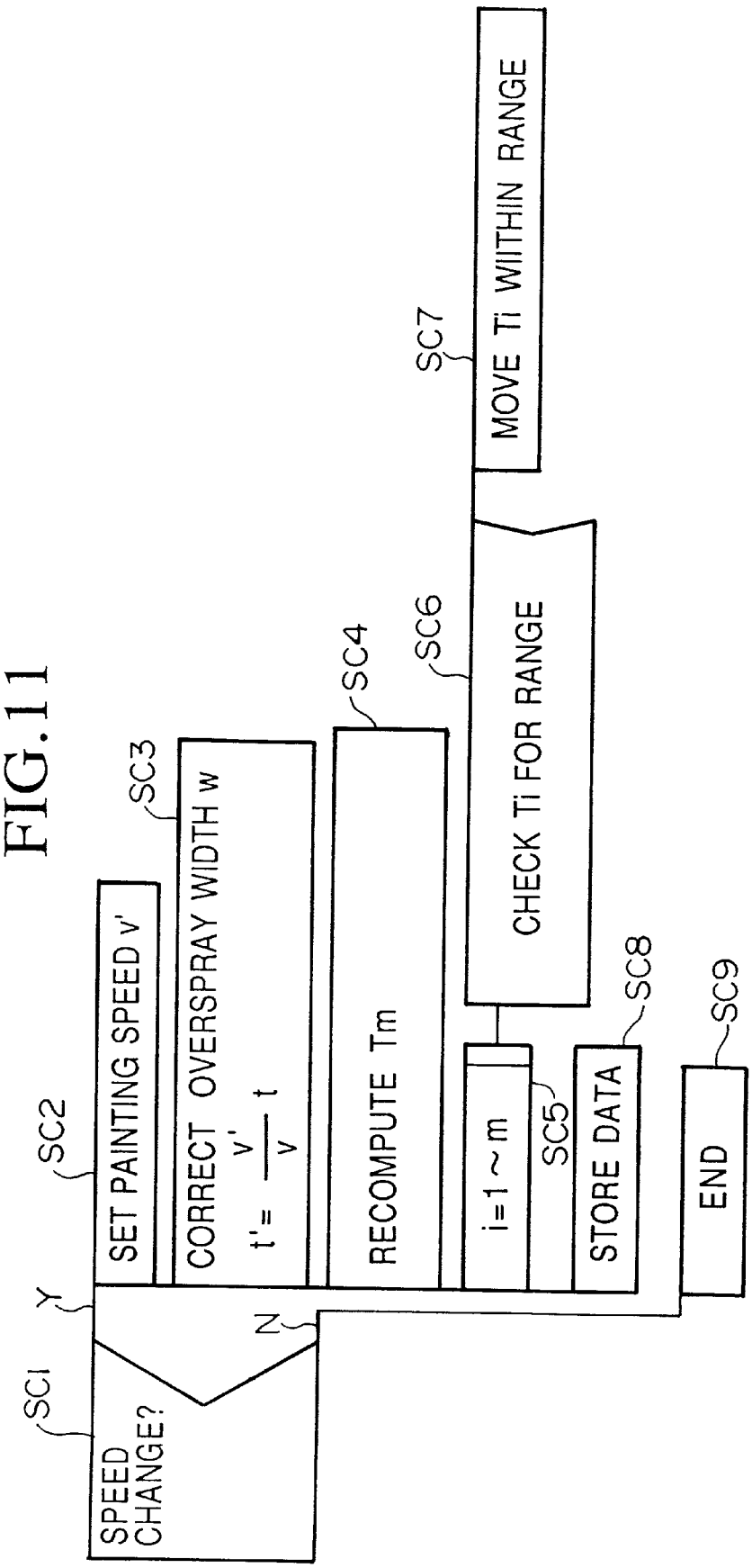
FIG. 11 is a PAD chart for CPU to correct the painting speed in the first embodiment.

The next series of descriptions with reference to FIG. 11 relates to the operation of CPU 6 in changing the painting speed v which is carried out in step SB7 shown in FIG. 8.

In step SC1, CPU 6 decides whether there is a change in the painting speed v. If the operator presses the speed change key on the teaching pendant 5, a suitable signal is sent to CPU 6. The decision in step SC1 is then YES, and CPU 6 proceeds to step SC2.

If, on the other hand, the operator does not press the speed change key on the teaching pendant 5, then the result in step SC1 is NO, and CPU 6 proceeds to step SC9 and completes this phase of the process.

In step SC2, if it is desired to change the painting speed from v to v', the operator inputs v' through the teaching pendant 5 which supplies a signal corresponding to v' to CPU 6. After CPU 6 stores the painting speed v' in RAM 8, it proceeds to step SC3.

In step SC3, CPU 6 computes the overspray width t' to match the painting speed v' from the following equation.

$$t=v't/v \quad (8)$$

where v is the painting speed before the change and v' is the painting speed after the change; t is the overspray width before the change and t' is the overspray width after the change. After completing such computations, CPU 6 proceeds to step SC4.

In step SC4, CPU 6 computes the start/end points of each pass in the screen track Tm' having the changed overspray width t' in the same manner as steps SB21~23 shown in FIG. 8. Here, t in equations (4) and (5) are replace with t'. After completing the computations, CPU 6 proceeds to step SC5.

In step SC5, CPU 6 inputs 1 in the counter parameter i and repeats the process, until i becomes m (in this example, m=10), then proceeds to step SC6.

In step SC6, CPU 6 examines whether all of the start points and end points of each of the passes in the screen track Tm' computed in equation (4) are within the motion capability range of the robot 1. If there are any start/end points which are outside the motion capability range of robot 1, CPU 6 proceeds to step SC7.

In step SC7, CPU 6 moves those start/end point which are outside the motion capability range so that they are located within the range, then returns to step SC5.

In step SC5, CPU 6 adds 1 to the counter parameter i, and proceeds to step SC6.

In step SC6, CPU 6 repeats the steps SC5~7 until the value of the counter parameter i becomes m (in this case, m=10), then, it proceeds to step SC8.

In step SC8, CPU 6 stores start/end points of the screen track Tm', all of which now lie within the motion range of robot 1, in the overspray data table in RAM 8.

The example in FIG. 11 presented a case of changing the overspray width t to t' automatically to match the changed painting speed from v to v', the painting speed is only one of many painting conditions in the painting operation. Another pertinent painting parameter is the entry angle of the spray gun 2, and this condition can also be dealt with in a similar manner.

As explained above, even a beginner can easily perform pass corrections for the robot control apparatus presented in Embodiment 1, because there is no need to set overspray width t for each correction of passes in the screen tracks.

Also, the overspray width is adjusted automatically when the painting speed is changed, therefore, there is no danger of producing defects such as paint drips near the turning point, and high quality of painting can be assured.

Further, the apparatus is provided with an ability to check whether the start/end points are all within the range of motion capability of the paint gun, therefore, there is no danger of the robot stopping any assembly line operation, and the productivity is improved.

The application of the robot control apparatus in the Embodiment 1 was demonstrated for a painting robot, but it is obvious that any industrial robot can be controlled by adopting the basic approaches to programming disclosed in the robot control apparatus of the present invention.

Embodiment 2

A second embodiment will be explained with reference to FIGS. 12 to 14.

The overall configuration of the painting robot is the same as that in the Embodiment 1, therefore no explanation will be provided for the same components, but. the differences from the conventional control apparatus will be explained in the following.

The preparation of teaching data is carried out by the four-point method explained in Related Art section above. Briefly, the controller 4 has a memory table such as the one shown in FIG. 28, which stores positional data for points PS1~PS4, speed v and the number of passes M. Henceforth, such data stored in the memory section of the controller 4 will be referred to as the basic data.

The method of preparation of teaching data using the basic data will be explained, but as in Embodiment 1, none of the function keys on the teaching pendant 5 is illustrated.

Figure 12:
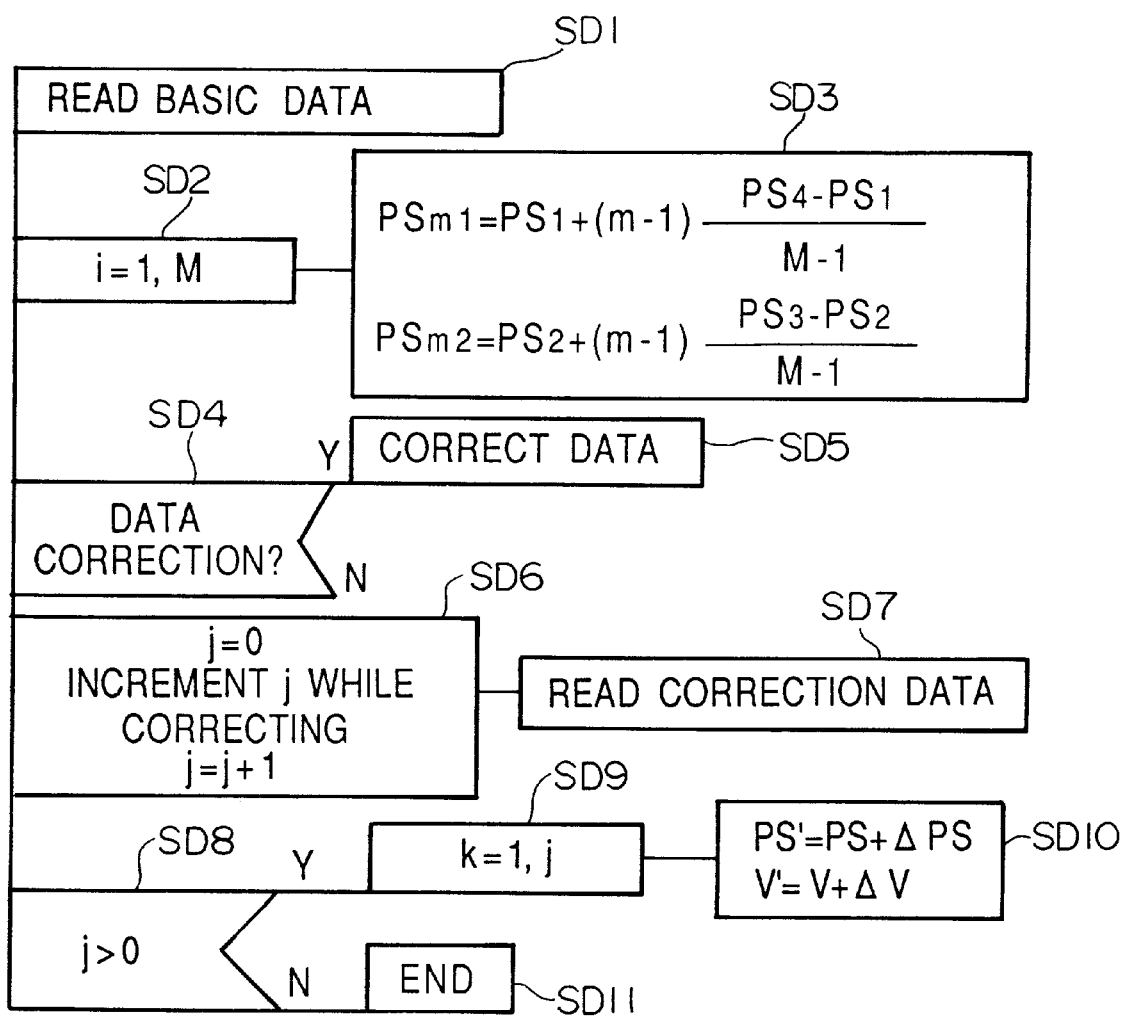
FIG. 12 is a PAD chart showing the steps taken by the controller during teaching data preparation in a second embodiment.

When the operator presses the teaching data preparation key on the teaching pendant 5, the controller 4 proceeds to step SD1 of the PAD chart shown in FIG. 12.

In step SD1, the controller 4 reads out the basic data (refer to FIG. 28) from the memory unit, and proceeds to step SD2.

In step SD2, the controller 4 repeats steps in SD3 until the counter parameter i becomes M (in this case, M=3). That is, the counter parameter i is incremented by 1 every time step SD3 is completed.

In step SD3, the controller 4 suaccsively enters 1 for m and 3 for M in equations (1) and (2) shown earlier to obtain start/end points for the passes PAS1~PAS3.

$$PS11 = PS1 + 0 \ (PS4-PS1)/2 = PS1$$

$$PS12 = PS2 + 0 \ (PS3-PS2)/2 = PS2$$

$$PS21 = PS1 + 1 \ (PS4-PS1)/2$$

$$PS22 = PS2 + 1 \ (PS3-PS2)/2$$

$$PS31 = PS1 + 2 \ (PS4-PS1)/2 = PS4$$

$$PS32 = PS2 + 0 \ (PS3-PS2)/2 = PS3$$

The controller 4 at this point returns to step SD2 to perform the iteration process, and when the counter parameter i turns 3, the controller 4 proceeds to step SD4.

In step SD4, the operator examines whether the teaching points computed in step SD3 need to be corrected, and if the decision is YES, it proceeds to step SD5. On the other hand, if the decision is NO, then it proceeds to SD6.

In step SD5, the operator inputs those teaching points which need to be corrected in the controller 4, and enters appropriate data through the controller panel. Based on the input data, the controller 4 computes corrected points, distance between the corrected points, i.e. the distance correction $\Delta PS$ from equation (9) shown below.

$$\Delta PS = PS' - PS \qquad (9)$$

where PS' is the target point (i.e. point after correction) and PS is the current points (i.e. points before correction).

Figures 13, 14:
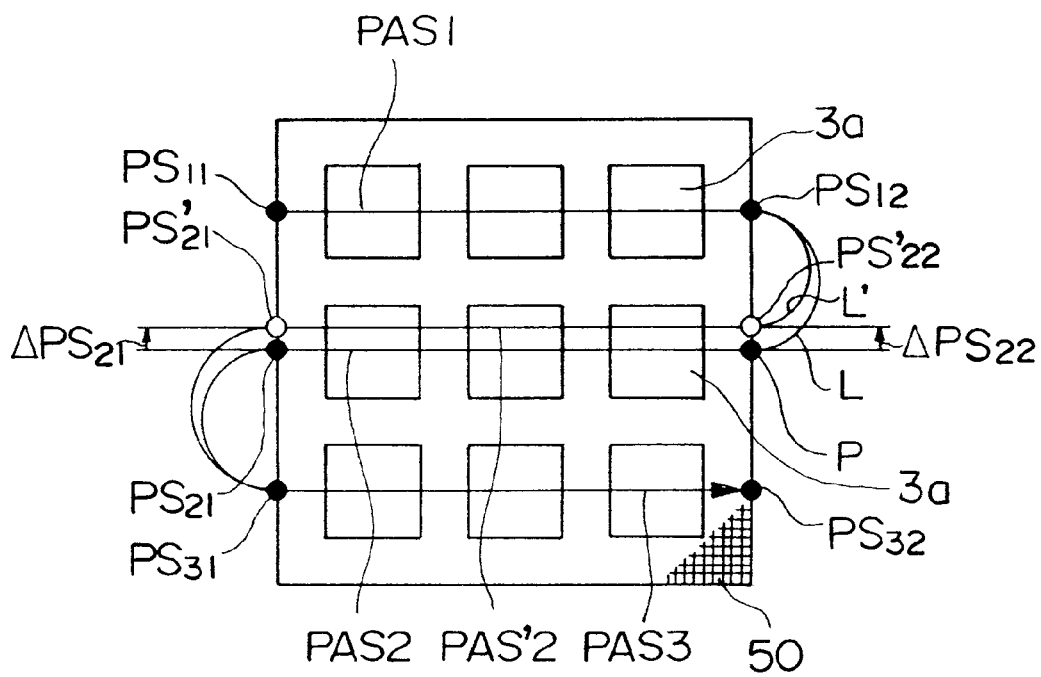
FIG. 13 is an illustration for correction of points PS21 and PS22 during teaching data preparation in the second embodiment.
FIG. 14 is a data table in the memory unit of the controller in the second embodiment.

Next, the controller 4 stores the distance corrections $\Delta PS$ and other i/o data presented above in the memory unit for each point number for the correction points as shown in FIG. 14, for example. The memory unit allocates different regions for the basic data (FIG. 28) and for the i/o data, thereby minimizing the size of the memory required.

The correction process will be illustrated with reference to FIG. 13. In FIG. 13, it is desired to change pass PAS2 to pass PAS2', involving the process of changing a point PS21 obtained in step SD3 to a point PS'21, and a point PS22 to a point PS'22, using the same method as described in Related Art. The operator specifies the points PS'21 and PS'22 to the controller 4 through the teaching pendant 5, and enters appropriate i/o data through the teaching pendant 5.

At this point, the controller 4 computes the distance corrections $\Delta PS21$ and $\Delta PS22$ by substituting PS'21 and PS'22 for PS' and PS21 and PS22 for PS in equation (9) as follows.

$$\Delta PS21 = PS'21 - PS21$$

$$\Delta PS22 = PS'22 - PS22$$

The controller 4 then stores the distance corrections $\Delta PS21$ and $\Delta PS22$ and i/o data in the allocated memory unit. In this case, there are two correction points, and therefore, the number of data stored in the memory unit is two.

When it is desired to correct the painting speed v in the basic data, the operator enters the desired speed v' through the teaching pendant 5. The controller 4 then computes the correction speed $\Delta v$, the difference between the current speed v (before correction) and the new speed v' after the correction, from equation (10) shown below.

$$\Delta v = v' - v \qquad (10)$$

After storing the correction speed $\Delta v$ in its memory unit as shown in FIG. 14, the controller 4 proceed to step SD6.

In step SD6, the controller 4 enters an initial value 0 in the counter parameter j. Then, if the distanee corrections $\Delta PS$ and $\Delta v$ are stored in its memory unit, the controller 4 repeats a processing cycle in step SD7 until the counter parameter j becomes equal to the number of data bearing the distance corrections $\Delta PS$ and correction speed $\Delta v$. That is, for each processing cycle in step SD7, the counter parameter j is incremented by 1.

Here, if the controller 4 decides, in step SD6, that there is no corrections data stored in the memory unit, it proceeds to step SD8.

In this case, the controller 4 recognizes the presence of distance corrections $\Delta PS$ and correction speed $\Delta v$, and proceeds to step SD7.

In step SD7, the controller 4 successively reads out the corrections data $\Delta PS$ and $\Delta v$ from the memory unit.

In this case, the controller 4 successively reads out the corrections data $\Delta PS21$ and $\Delta PS22$ and $\Delta v$ in its memory unit, and returns to step SD6.

In step SD6, after completing the processing cycle in step SD7 and the counter parameter turns to 3, the controller 4 proceeds to step SD8.

In step SD8, the controller 4 examines whether the counter parameter j is larger than 0, and if the decision is NO, it proceeds to step SD11 and completes the preparation of teaching data. If on the other hand, the decision is YES, the controller 4 proceeds to step SD9. In this case, the controller 4 recognizes that the counter parameter j is 3, and proceeds to step SD9.

In step SD9, the controller 4 repeats the processing cycle until the pass parameter k becomnes equal to the counter parameter (in this case j=3). That is, for each processing cycle in step SD10, the pass parameter k is incremented by 1.

In step SD10, the controller 4 enters successive data for the start/end points of the passes computed by equation (3), i.e. the desired points PS, and the distance corrections ΔPS computed by equation (9) in equation (11) shown below to obtain the desired points PS'.

$$PS'=PS+\Delta PS \qquad (11)$$

In this case, the controller 4 successively enters the point data PS21 and PS22 for PS and ΔPS21 and distance corrections ΔPS22 for ΔPS in equation (11) to obtain the following PS'21 and PS'22.

$$PS'21=PS21+\Delta PS21$$

$$PS'22=PS22+\Delta PS22$$

The controller 4 further obtains the new speed v', by adding the correction speed Δv obtained in equation (10) to the current painting speed v, from equation (12) shown below.

$$v'=v+\Delta v \qquad (12)$$

Reviewing the features of Embodiment 2, the following salient points may be noted.

(1) A small capacity memory device (such as a floppy disk) can be used to store the teaching data.
(2) By shortening the access time to the memory location (read/write steps), the preparation time for teaching data is also shortened.
(3) Because of the use of stored basic data in the simple four-point method of teaching, the time for preparation of teaching data is significantly shortened.
(4) The time required to instruct the operator in the preparation of teaching data is shortened significantly.
(5) It enables to meet the needs of single production or large variety, small-quantity production of goods.
(6) Preparation of teaching data does not require expertise and know-how and can be performed by non-experts.

It should be noted that although the application of the robot control apparatus in the Embodiment 2 was demonstrated for a painting robot, it is obvious that any industrial robot can be controlled by using the robot control apparatus of the present invention.

Further, memory configurations such as those shown in FIG. 12 for PAD chart and in FIG. 14 for data table in the controller 4 are examples, and do not limit the scope of the present invention in any way.

Further, the embodiments related to a one-dimensional correction of teaching points, but it is obvious that two- or three-dimensional corrections can easily be developed based on the techniques disclosed in the present invention.

Embodiment 3

A third embodiment will be explained with reference to FIGS. 15 to 23.

Figure 30:
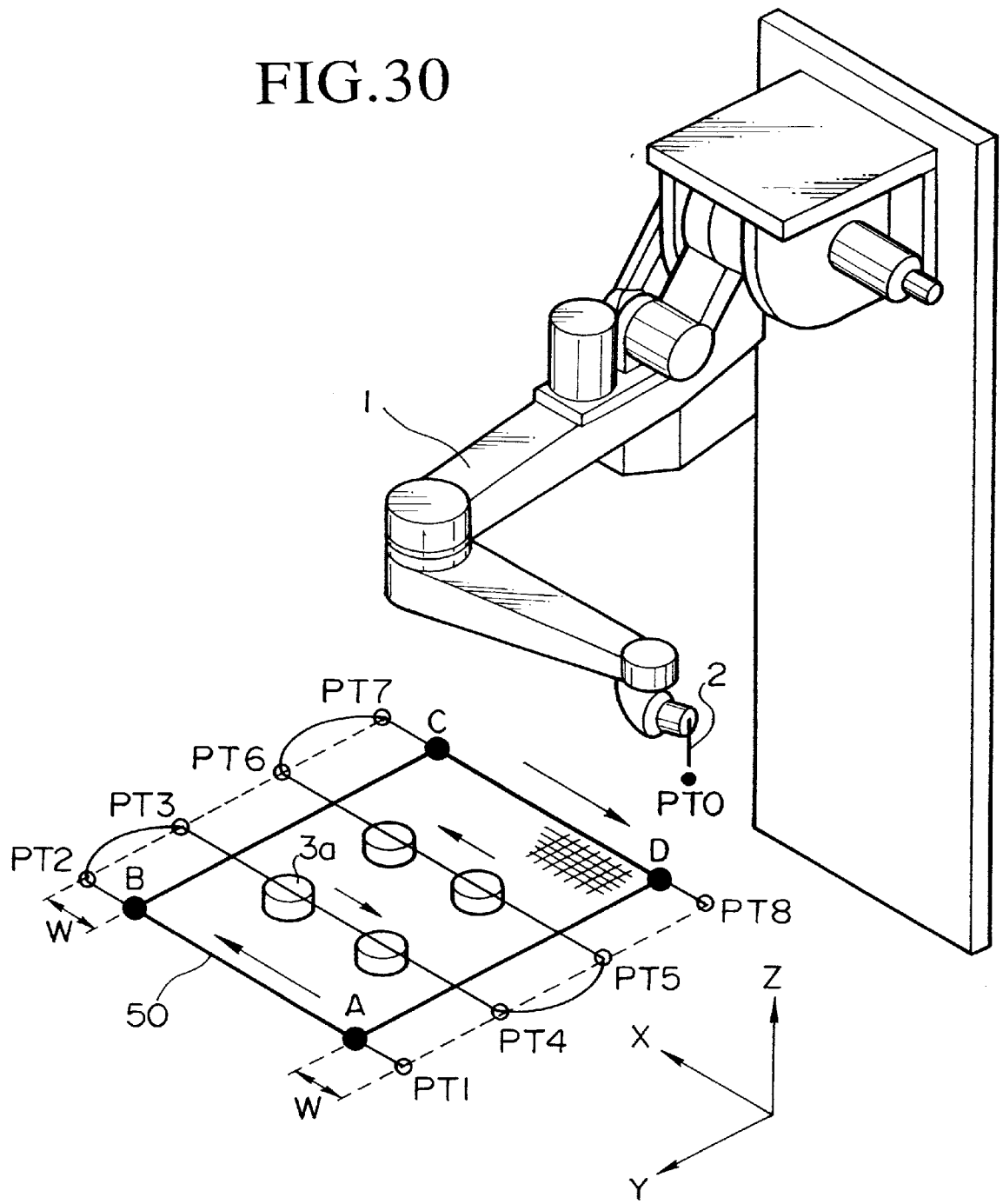
FIG. 30 is a perspective view of the painting track and the position of the workpieces during a teaching task.

Basically, the structural configuration of the painting robot in Embodiment 3 is the same as that in Embodiment 1. The difference is that the controller 4 has been replaced with a controller 4' and the teaching pendant 5 has been replaced with a teaching pendant 5'. Also, the painting track and position of the workpieces of the robotic painting system in this embodiment are the same as those shown in FIG. 30.

Figure 15:
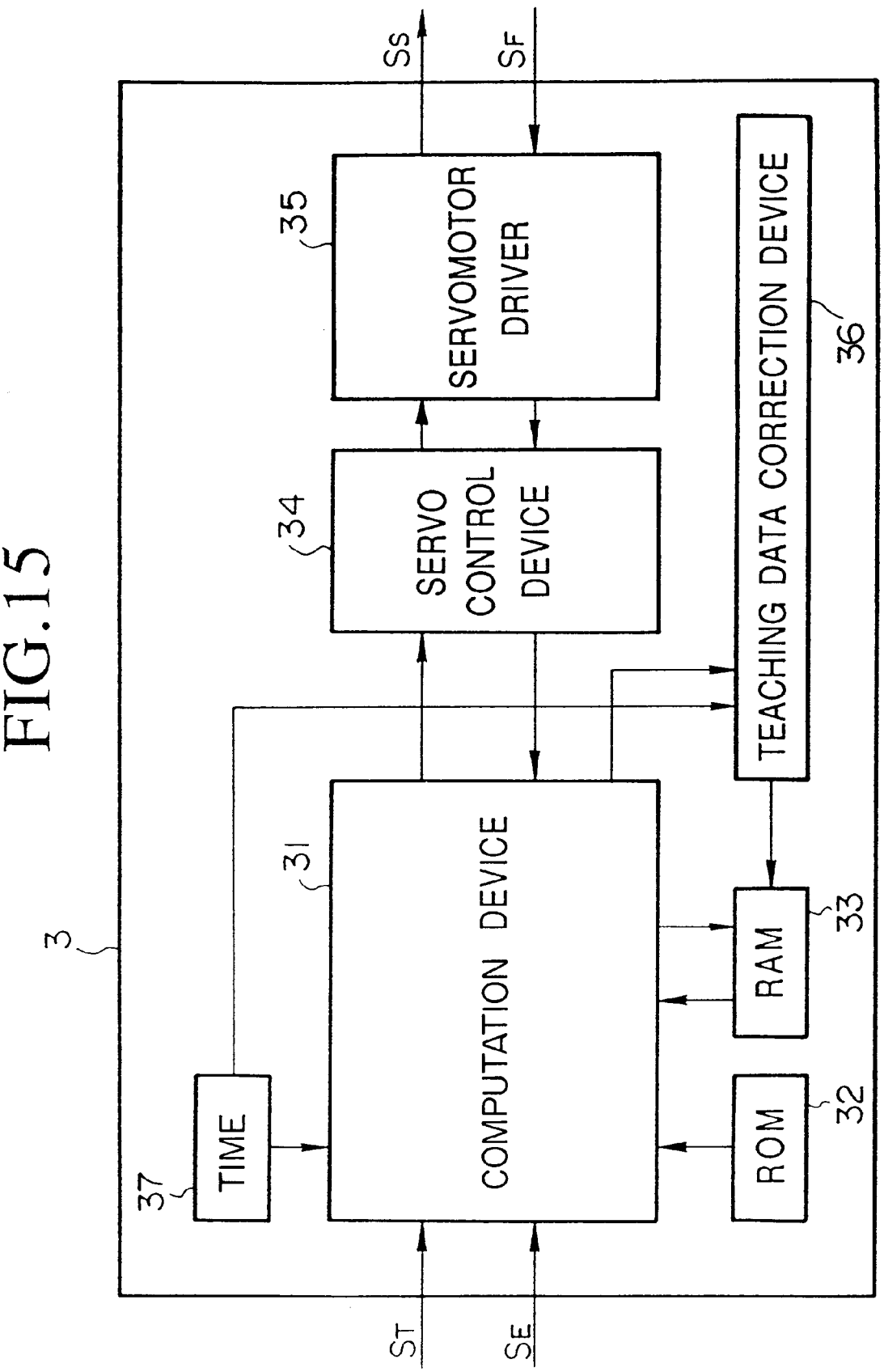
FIG. 15 is a block diagram of the electrical layout of the teaching device of a third embodiment.

FIG. 15 shows a block circuit diagram of the control apparatus (controller 4') in Embodiment 3.

Various functions of the controller 4' are performed by a control program stored in ROM 32 through the processing control of RAM 33.

A servo-control section 34 supplies a speed command signal, under the control of a computation device 31, to the servomotor driver 35 according to the position feedback signal SF output from an encoder housed in each of the rotation shaft of the robot 1 and input through the servomotor driver 35.

The servomotor driver 35 generates a servomotor drive signal SS according to the speed command signal, and operates a servomotor housed in each of the rotation shafts of the robot 1.

Also, the position feedback signal SF is supplied to the computation device 31 through the servomotor driver 35 and the servo-control section 34.

The computation device 31 is a multi-tasking device, and during the teaching data reproduction period of the data in the computation device 31, a teaching data correction device (shortened to data correction device) 36 performs a data correction process (refer to FIGS. 19~21) to correct the teaching data stored in RAM 33 for each pulse signal output at regular sampling intervals from a timer 37. The details of FIGS. 19~21 will be presented later.

The timer 37 can supply pulse signals at different sampling intervals to a number of devices, and in this embodiment, supplies pulse signals at 10 ms intervals to the data correction device 36 and at 1 ms intervals to the computation device 31.

Figure 16:
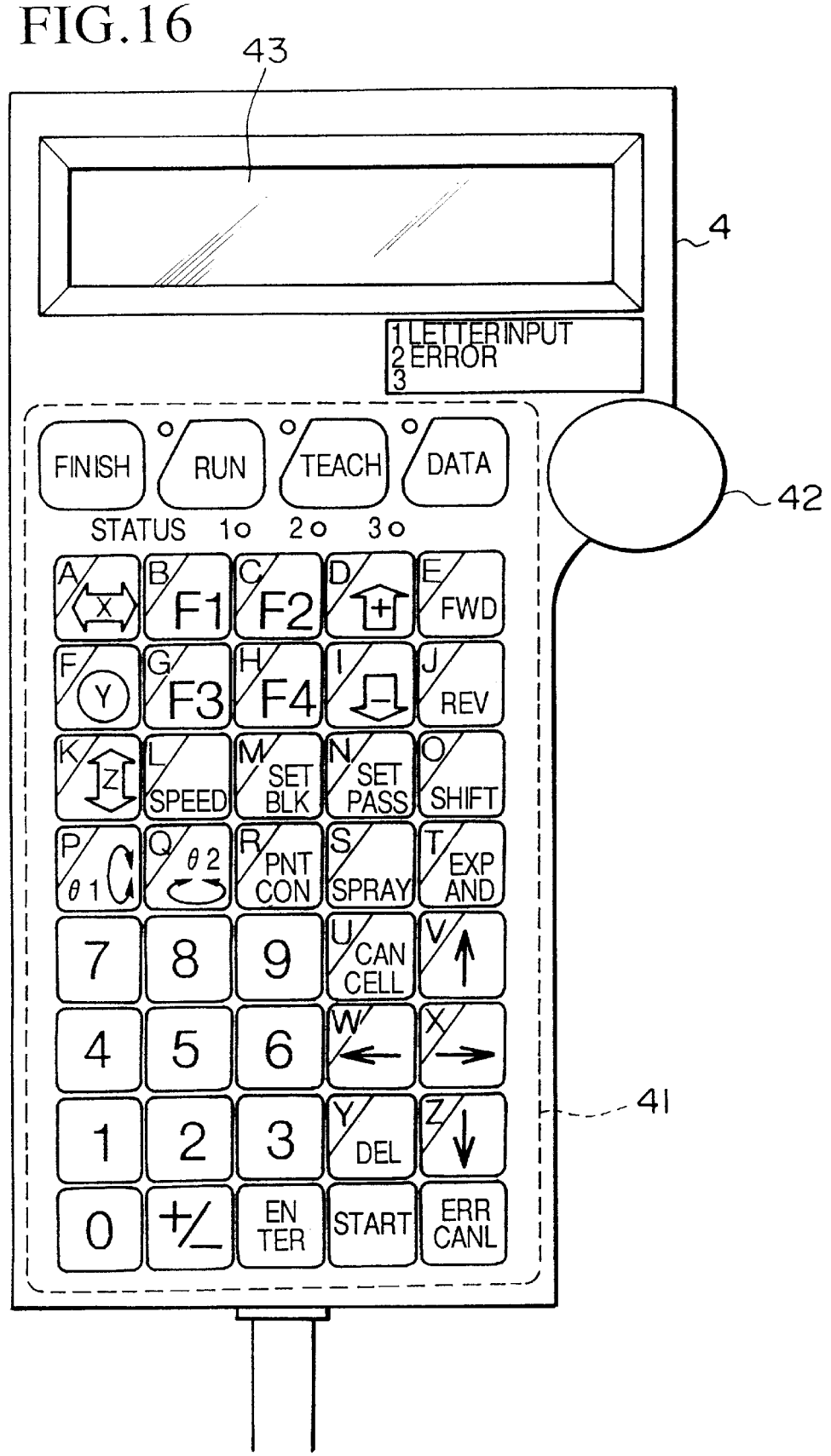
FIG. 16 is an external appearance of the keyboard of the teaching pendant in the third embodiment.
Figure 17:
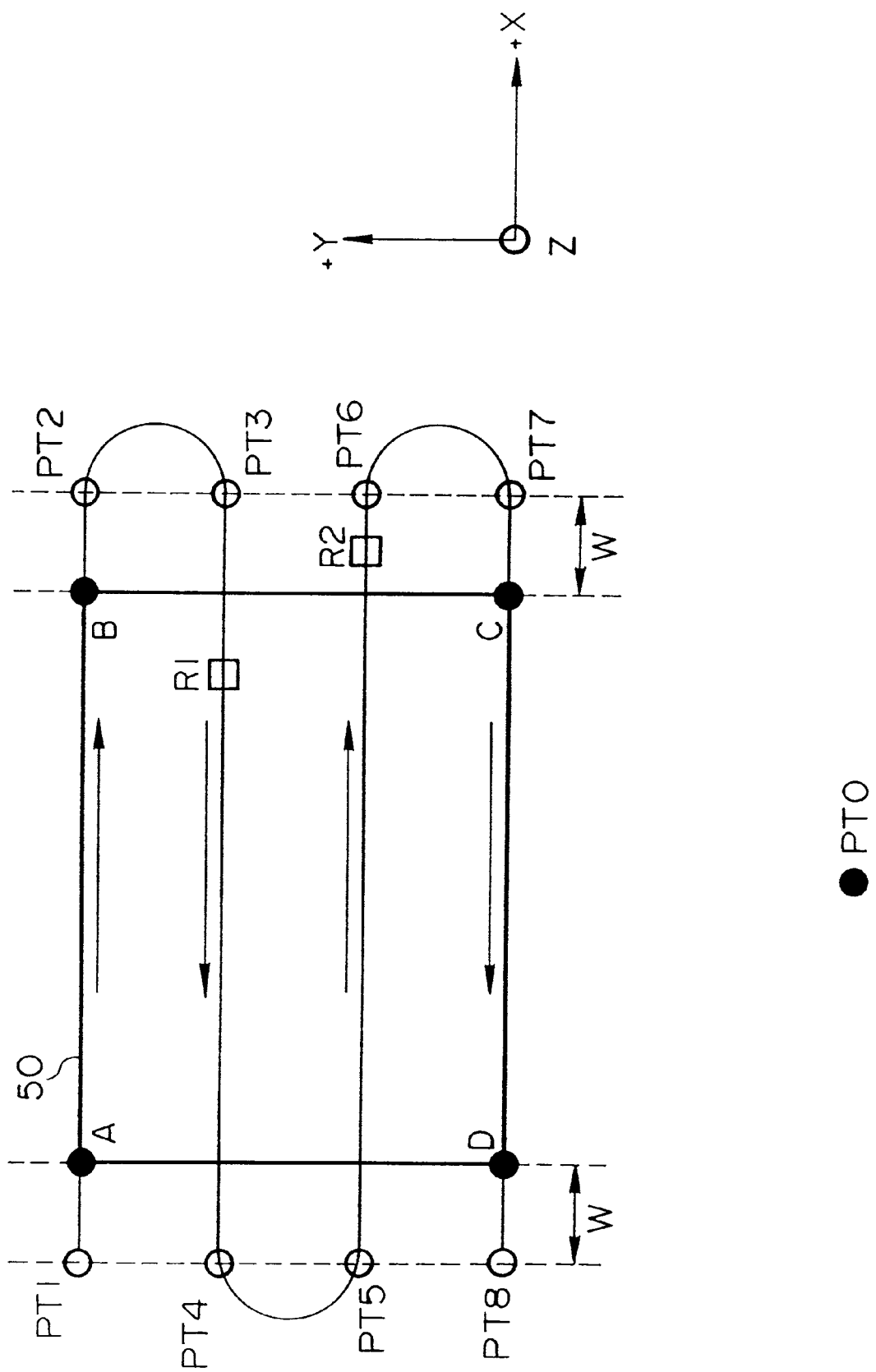
FIG. 17 is a plan view showing the relationship between the painting track and the track point PT1~PT8 in the third embodiment.

FIG. 16 shows a teaching pendant 5' used in Embodiment 3, having input keys 41, an emergency stop key 42 and a display section 43.

The teaching pendant 5' is different than conventional types of teaching pendant in that the data reproduction key of the input keys 41 is a two-stroke key which can be depressed in two stages in accordance with the degree of pressing force exerted on the key.

When the data reproduction key is depressed to its first stop, it reaches the first mode of the controller 4' which works in the same manner as the conventional type of data reproduction by teaching pendant (referred to as the normal mode). When the key is depressed further, the key travels a longer stroke, and assumes a reproduction mode for the controller 4' which allows correction of teaching data during its reproduction operation (referred to as the corrective reproduction mode).

The corrective reproduction mode is a hierarchical mode and has all the functions that the normal reproduction mode provides, and the controller 4' can provide all the functions of data reproduction as usual in addition to the capability of data correction (presented in FIGS. 19~21) during the reproduction operation.

By providing the two types of reproduction mode, the operator has a choice of selecting a normal mode to simply review the teaching data or a corrective mode to perform correction of the teaching data. This approach has an advantage that unintentional correction of teaching data can be prevented because the corrective steps can only be taken when the corrective mode is chosen intentionally by the operator.

The operation of the control apparatus of Embodiment 3 will be presented in the following. The operator follows the steps presented in Related Art to set the corner point A~D of the metal screen shown in FIG. 30 and the standby position PTO, and sets the painting parameters (such as painting speed of the paint gun 2, overspray width w and volume of spray and the like). When the parameter setting steps are completed, the operator presses the end key on the teaching pendant 5'. The computation device 31 then computes the coordinates of the track points PT1~PT8 shown in FIG. 17 and stores the values in RAM33.

At the same time as storing of the computed values of the coordinates of the track points, the computation device 31 also stores data referred to as teaching data elements in RAM33. The teaching data elements relate to each piece of operational information such as spray volume from the paint gun 2, painting speed, spray start/end commands, distance from the tip of spray gun 2 to workpieces.

Next, the computation device 31 examines to confirm that all the essential painting conditions to be met at all teaching points are provided, such as whether all the points are within the range of motion of the paint gun 2 (paint range), whether the set painting speed of the paint gun 2 exceeds the maximum capable speed of the arm tip of robot 1. When the teaching data do not satisfy these requirements, the controller 4' so reports this condition to the operator through such warning means as speaker or warning light. The operator then corrects the teaching points by reprogramming the teaching points or resetting the painting parameters.

When all the essential painting conditions are satisfied and the computation device 31 is ready to reproduce the teaching points, the operator presses on the reproduce key on the teaching pendant 5' strongly to reach the second stage and set the controller 4' in the corrective mode. In the corrective mode, the timer 37 begins supplying pulse signals at 10 ms intervals to the teaching data correction device (data correction device) 36.

Next, the operator presses the start key on the teaching pendant 5' shown in FIG. 16, then every time the computation device 31 receives the pulse signal from the timer 37, the computation device 31 computes the track joining the track point that the paint gun 2 has presently passed through (or the current track point) and the next track point (referred to as target track point) on the track. The computation results are forwarded to the servo-control section 34 shown in FIG. 15. In practice, when the tip of the paint gun 2 is situated at R1 in FIG. 17, the computation device 31 computes a track joining the track points PT3 and PT4, and when it is at R2, the device 31 computes a track joining track points PT5 and PT6.

The servo-control section 34 compares the coordinates of the computed tracks and the coordinates of the paint gun 2 computed from the feedback value SF, and generates a speed command signal, maintaining within a given error range, to be supplied to the servomotor driver 35. The speed command signal provides each of the rotation shaft of robot 1 with a signal so that the paint gun 2 will move towards the target point on the track. The servomotor driver 35 converts the speed command signal to a servomotor operation signal SS to be supplied to each of the motor housed in the rotation shaft.

Next, the correction process for correcting the teaching data by the data correction device 36 will be presented with reference to FIGS. 18~23.

Figure 18:
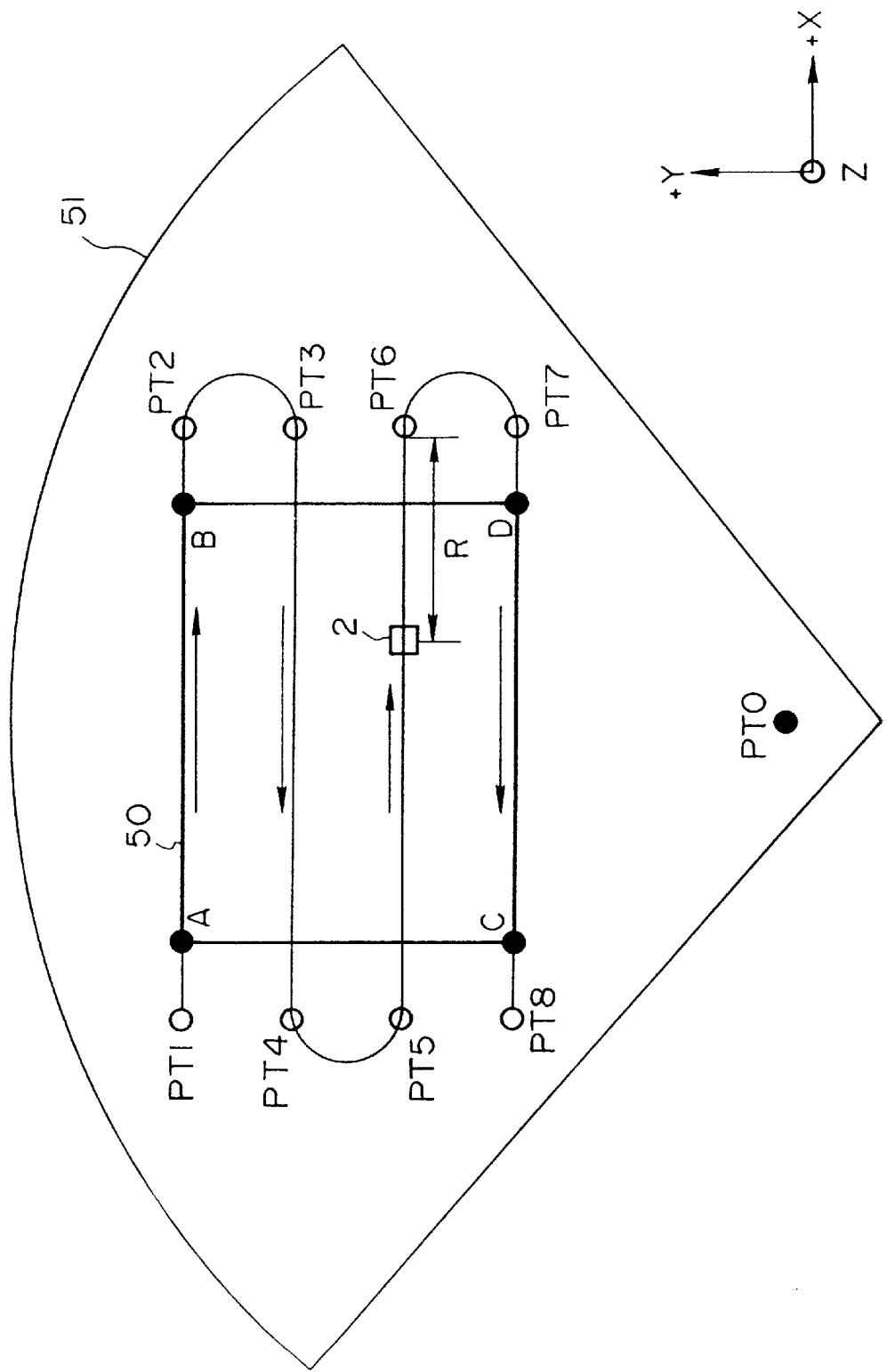
FIG. 18 is a plan view showing the initial conditions in an example of procedure for correcting teaching data in the third embodiment.

Assume that the computation device 31 is in the process of reproducing the teaching data after having completed the teaching process and obtained the track points PT1~PT8 as shown in FIG. 18. Assume also, in FIG. 18, that each of the track points PT1~PT8 is within the painting range 51, and that the painting gun 2, having passed track point PT5, is in the process of moving towards the target track point PT6, and that the distance between the paint gun 2 and the target track point PT6 is 300 mm.

Figure 19:
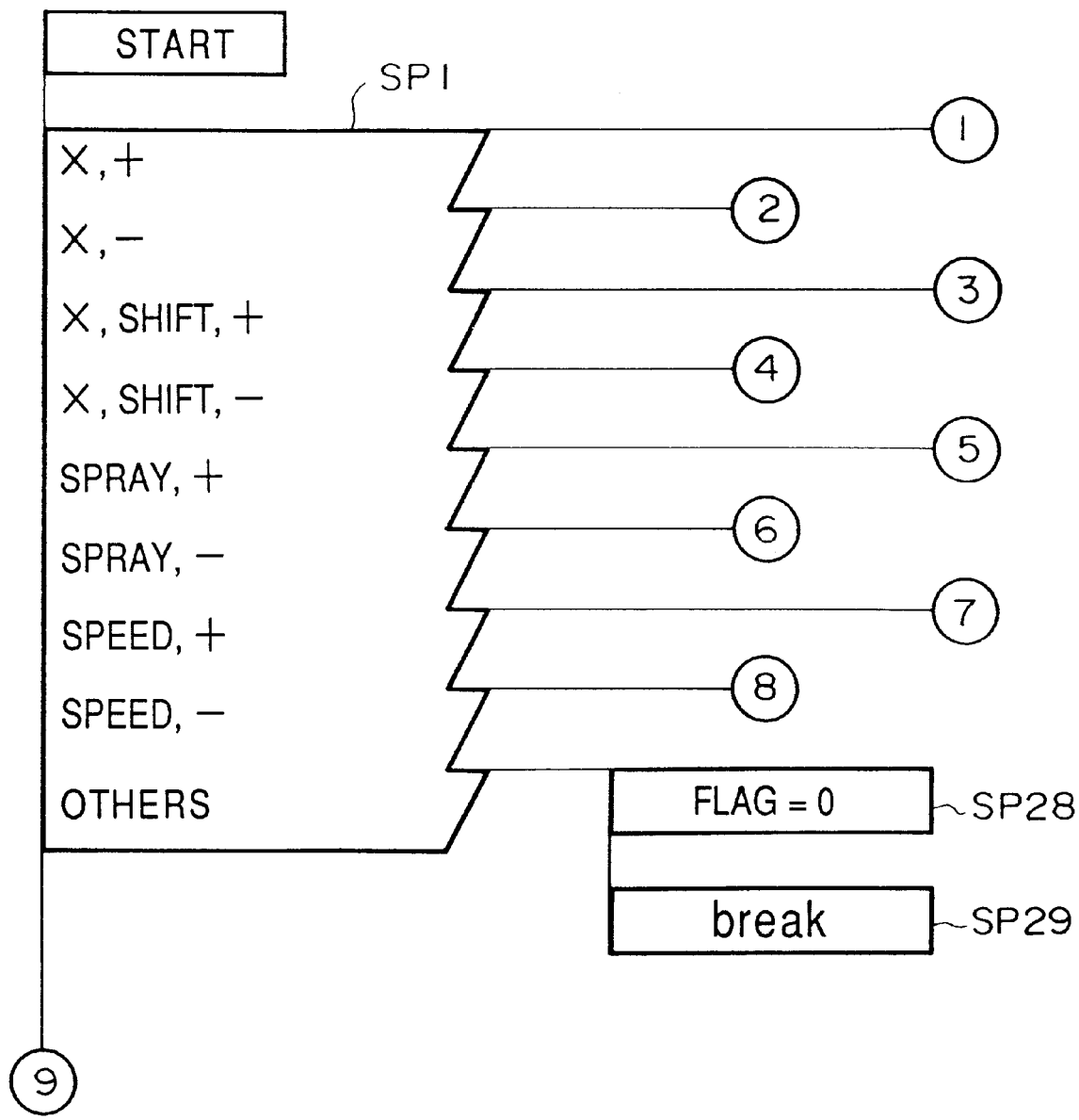
FIG. 19 is a PAD chart showing the flow of teaching data correction steps in the third embodiment.

During the data reproduction phase of the computation device 31, the data correction device 36 proceeds to step SP1, shown in FIG. 19, upon receiving a pulse signal generated at a 10 ms interval from the timer 37, to begin the data correction process.

In step SP1, the device 31 examines which key of the input keys 41 is being pressed. Assume, in FIG. 18, that the operator wishes to move track points PT2, PT3, PT6 and PT7 in the positive direction on the x-axis, and presses keys "X" and "+" simultaneously. In response, the device 31 moves to step SP2 shown in FIG. 20.

In step SP2, the device 31 accepts track points PT2, PT3, PT6 and PT7 as the selected track points, and writes the coordinates of each of the track points in working area of RAM 33, and proceeds to step SP3. In this embodiment, these coordinates written in the working are referred to as temporary positional data.

In step SP3, the device 31 adds X to the X-coordinate of each of the temporary positional data, and proceeds to step SP4. In this embodiment, the value of X is 1 mm. The processing in step SP3 changes the temporary positional data for the selected track points PT2, PT3, PT6 and PT7 to those of track points PT2', PT3', PT6' and PT7'.

In step SP4, the device 31 enters 1 in the variable FLAG in the working area of RAM 33 so as to indicate that the parameter to be corrected is the coordinates of the track points.

Figure 20:
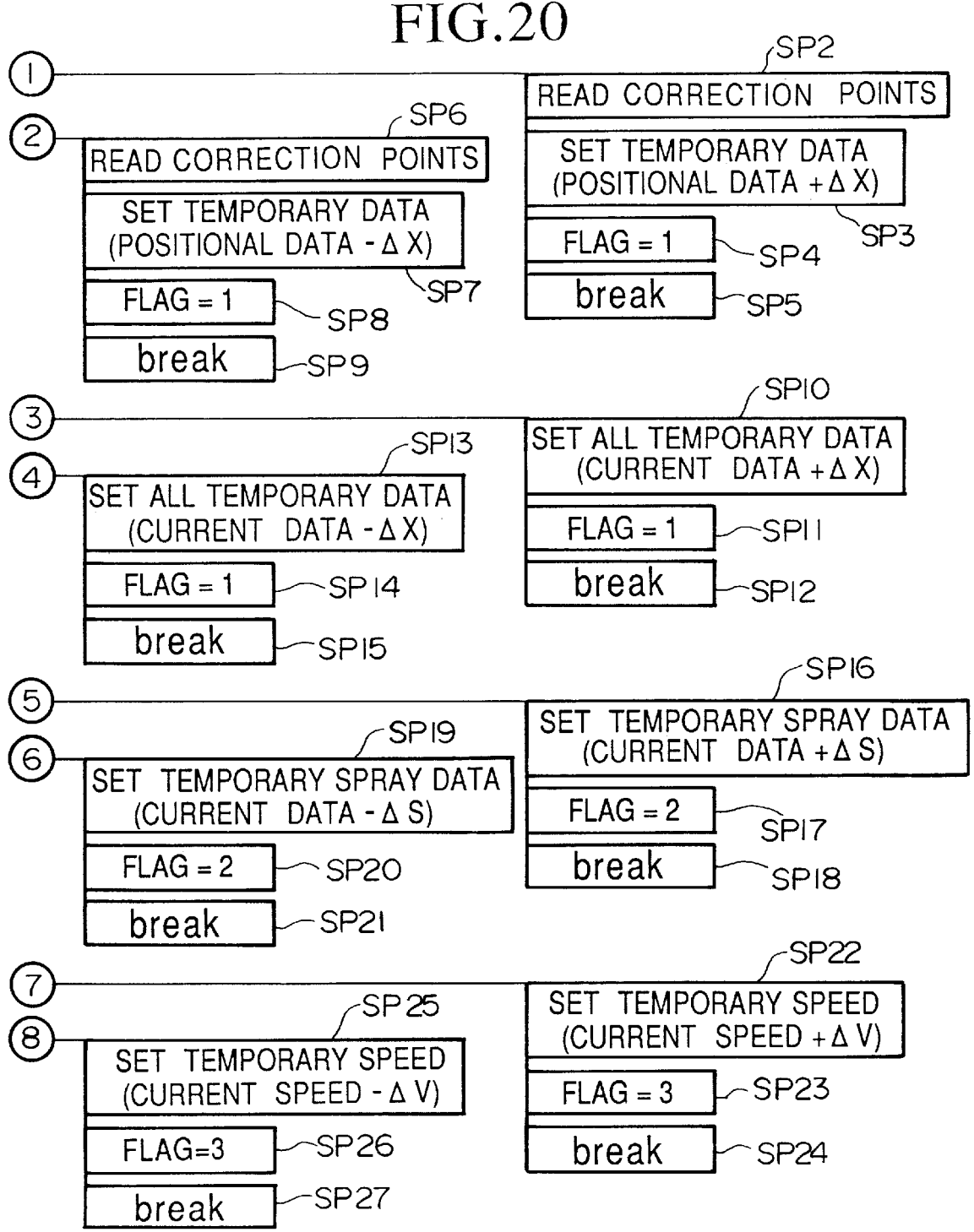
FIG. 20 is a PAD chart showing the flow of teaching data correction steps in the third embodiment.

Assume that in step SP1, the operator wishes to move the track points, in FIG. 18, PT1, PT4, PT5 and PT8 in the negative direction on the X-axis, and presses the keys "X" and "−" simultaneously on the teaching pendant 5', then the device 31 responds and proceeds to step SP6 shown in FIG. 20.

The processing steps in step SP6~SP9 are the same as those in steps SP2~SP5 excepting that the selected track points are PT1, PT4, PT5 and PT8 shown in FIG. 18 and X is subtracted from the coordinates for each of the temporary positional data of the selected track points. The details will be omitted.

On the other hand, if the operator in step SP1 wishes to move all the track points PT1~PT8 in the positive direction on the X-axis, the operator presses the keys "X", "+" and "shift" simultaneously. The device 31 then proceeds to step SP10 shown in FIG. 20.

The explanation for steps SP10~SP12 will be omitted here, because they are the same as those in steps SP2~SP5, except that all the track points PT1~PT8 shown in FIG. 18 are selected to move.

Figure 23:
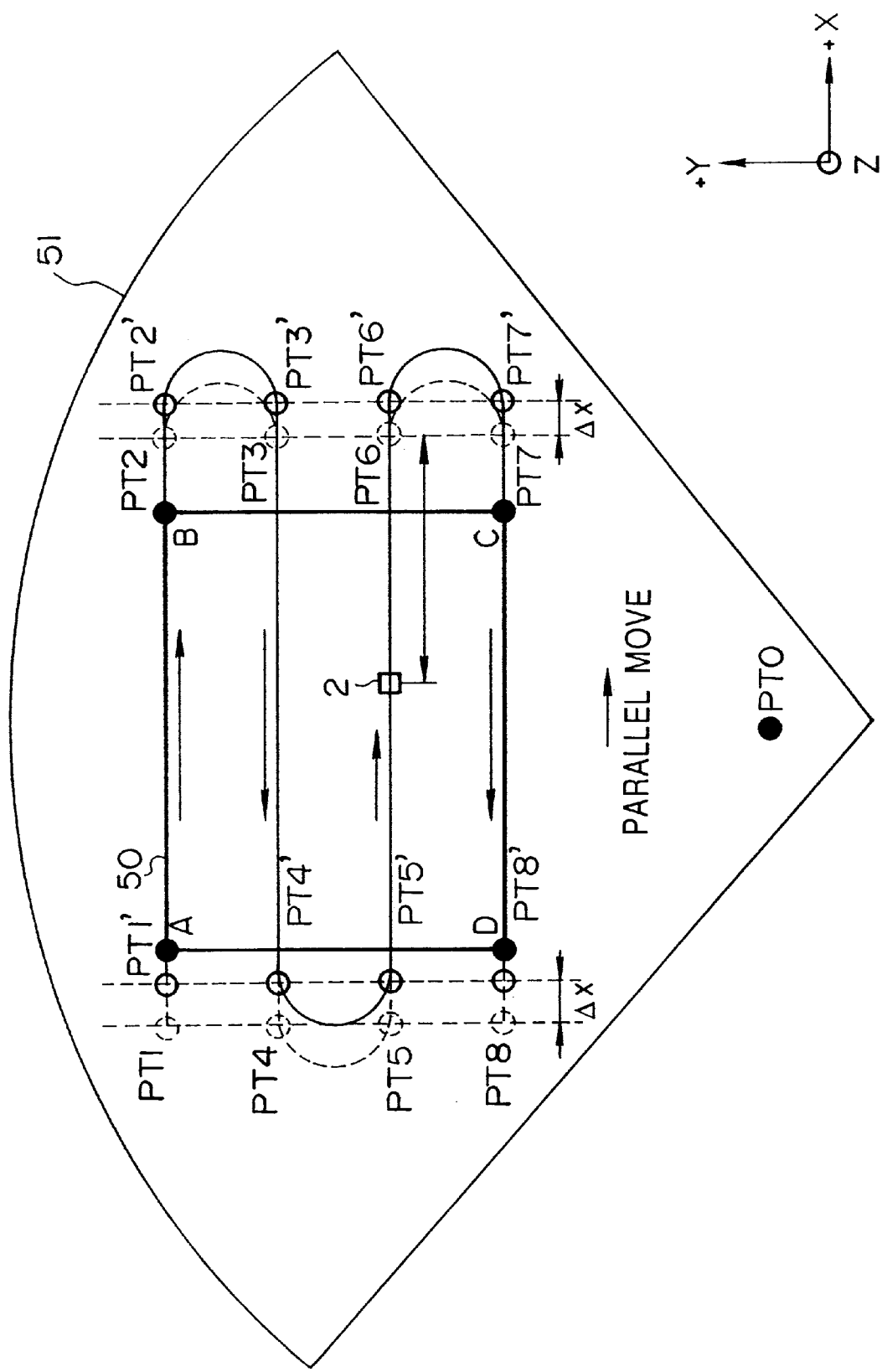
Figure 24:
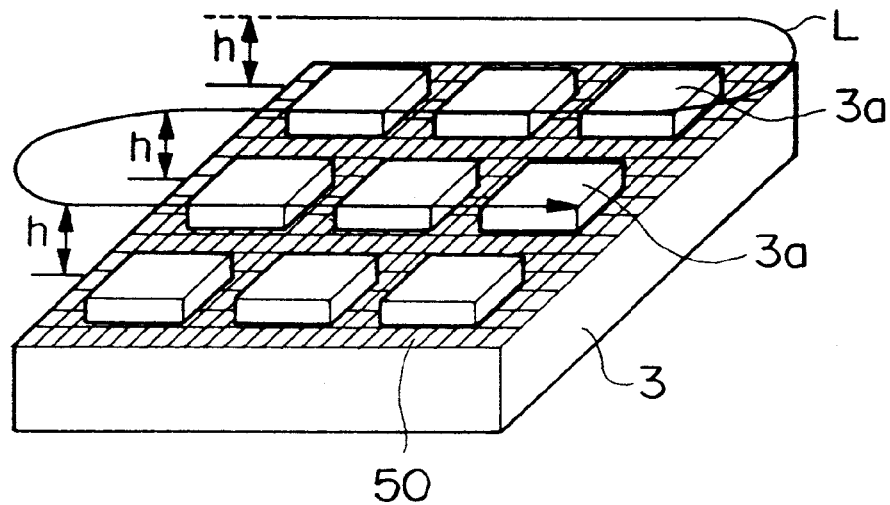
FIG. 24 is an example of teaching data preparation for track L using the conventional robot control device.
Figure 25:
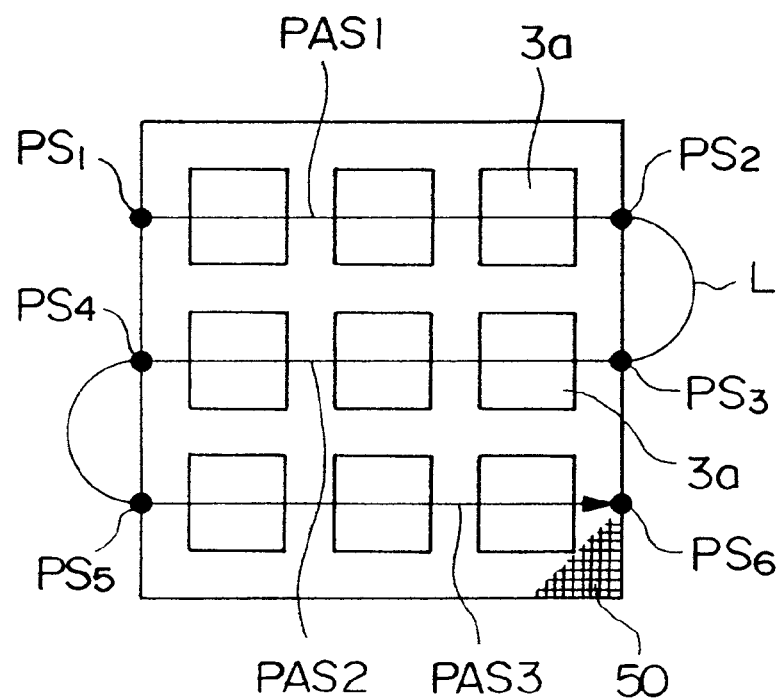
FIG. 25 is an illustration of the teaching data preparation according to the multipoint teaching method.

The results of steps SP10~SP12 are that the coordinates of the track points PT1~PT8 are moved to the coordinates PT1'~PT8' of temporary positional data shown in FIG. 23.

On the other hand, if the operator in step SP1 wishes to move all the track points PT1~PT8 in the negative direction along the X-axis, the operator presses the keys, "X", "−" and "shift" simultaneously. The device 31 then moves to step SP13.

The explanation for steps SP13~SP15 will again be omitted here, because they are the same as those in steps SP6~SP9, except that all the track points PT1~PT8 shown in FIG. 18 are selected to move.

In the meanwhile, in step SP1, the operator wishes to increase the volume of spray from the paint gun 2, the operator presses the keys "Spray", "+" on the teaching pendant 5' simultaneously. The device 31 then proceeds to step SP16.

In step SP16, the device 31 outputs the current volume of spray from the paint gun 2 in the working area of RAM 33. In this embodiment, the volume data written in the working area of RAM 33 is termed the temporary volume. The device 31 adds a spray volume correction S to the temporary volume, and proceeds to step SP17. In this embodiment, the spray volume correction is 1 mL/s.

In step SP17, the device 31 enters 2 in the variable flag FLAG in the working area of RAM 33 so as to indicate that the parameter to be corrected is the spray volume of the paint gun 2.

On the other hand, in step SP1, if the operator wishes to decrease the volume of spray from the paint gun 2, the operator presses the keys "Spray", "−" on the teaching pendant 5' simultaneously. The device 31 then proceeds to step SP19.

The explanation for steps SP19~SP21 will be omitted here, because they are the same as those in steps SP16~SP18, except that the decrement spray volume is subtracted from the temporary volume.

If, in step SP1, the operator wishes to increase the speed of the paint gun 2, the operator presses the keys "speed" and "+" on the teaching pendant 5' simultaneously. The device 31 then proceeds to step SP22.

In step SP22, the device 31 writes the current speed of the paint gun 2 in the working area of RAM 33, which becomes temporary speed, adds painting speed correction V to the temporary speed, and proceeds to step SP23. In this embodiment, the painting speed correction V is 0.1 m/s.

In step SP23, the device 31 enters 3 in the variable flag FLAG in the working area of RAM 33 so as to indicate that the parameter to be corrected is the speed of the paint gun 2.

If in step SP1, the operator wishes to decrease the speed of the paint gun 2, the operator presses the keys "speed" and "−" on the teaching pendant 5' simultaneously. The device 31 then proceeds to step SP25.

The explanation for steps SP25~SP27 will again be omitted here, because they are the same as those in steps SP22~SP24, except that the decrement speed is subtracted from the temporary speed.

When the operator in step SP1 presses other combination of input keys 41 or does nothing to the keys 41, the device 31 proceeds to step SP28. In step SP28, the device 31 enters 0 in the variable flag FLAG in the working area of RAM 33 so as to indicate that there has been no input of data to indicated any parameters to be corrected by the data correction device 36.

Figure 21:
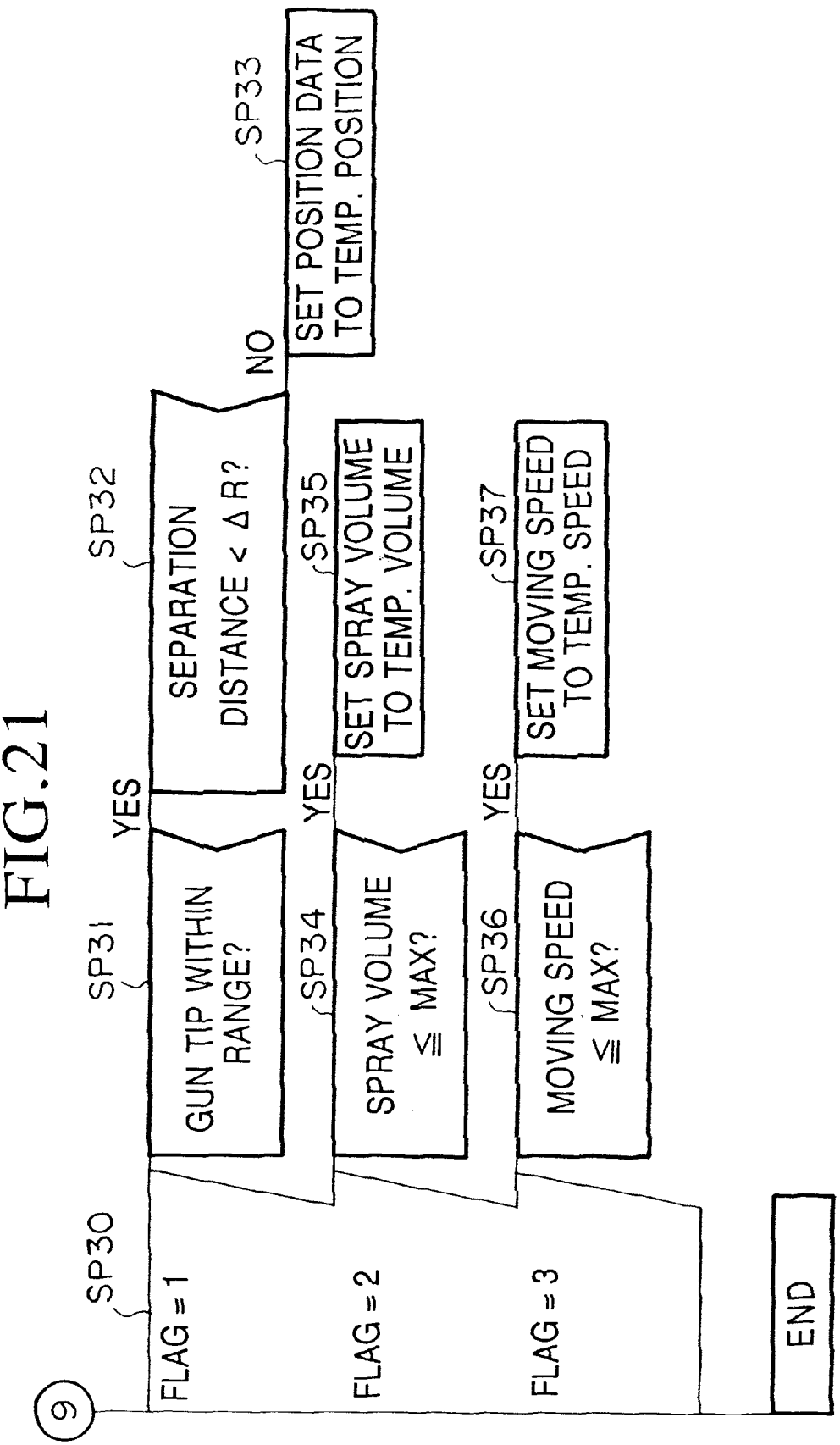
FIG. 21 is a PAD chart showing the flow of teaching data correction steps in the third embodiment.
Figure 22:
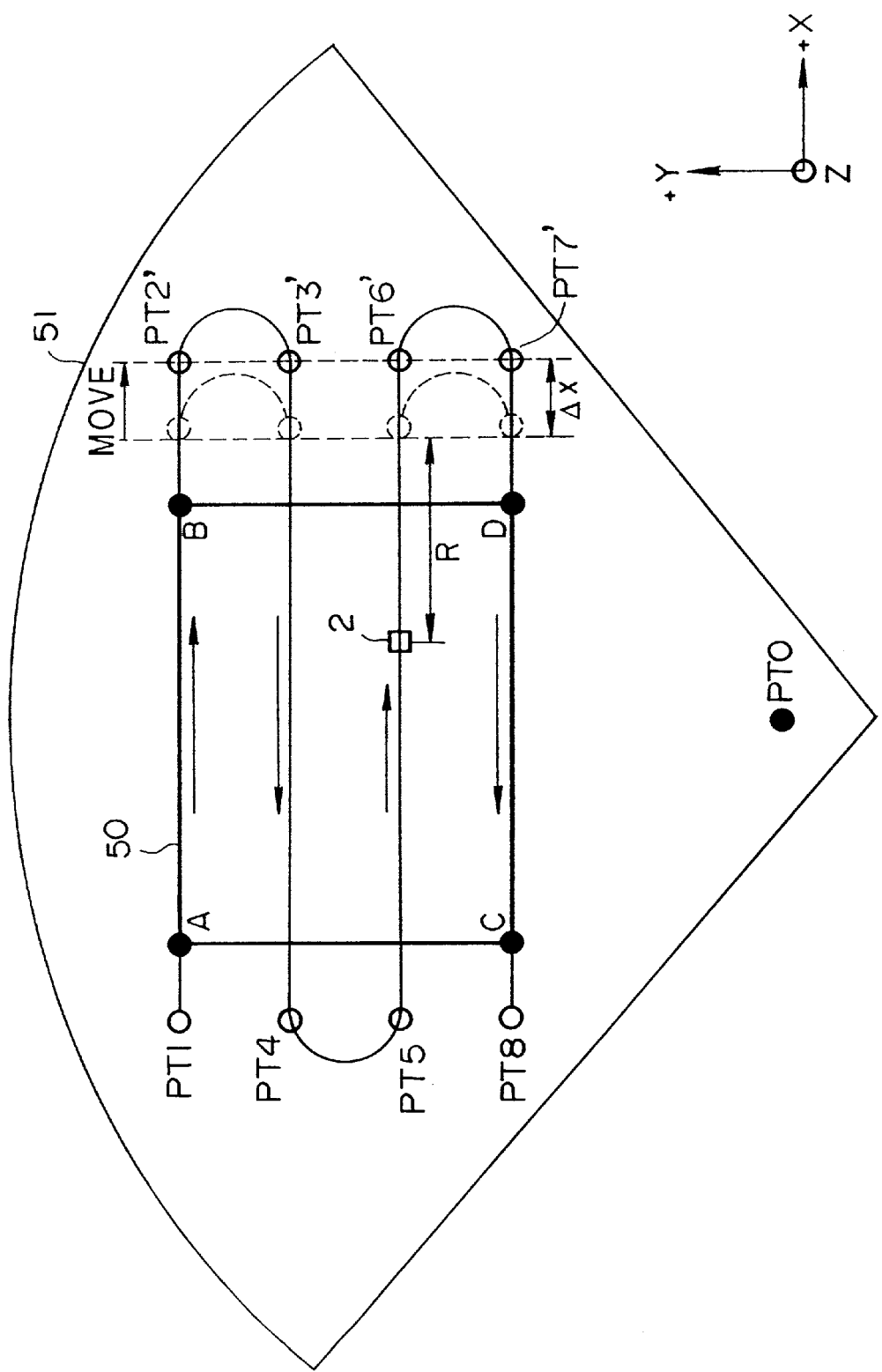
FIGS. 22 and 23 are plan views of examples of correcting the coordinates of the track points in the third embodiment.

When any one computation process for the temporary positional data, temporary spray volume and temporary speed is completed, the device 31 proceeds to step SP30 shown in FIG. 21.

In step SP30, the device examines which of the temporary data (positional data, spray volume and speed) should be corrected by examining the value of the flag FLAG so as to decide which of the subsequent steps, SP31~SP33 for coordinates correction, SP34, SP35 for volume correction, and SP36, SP37 for speed correction should be undertaken by the data correction device 36.

In step SP30, if the flag FLAG=1, the device 31 proceeds to step SP31.

In step SP31, the device 31 examines whether all the temporary positional data are within the painting range 51. In the example shown in FIG. 22, all the coordinates for the track points PT2', PT3', PT4' and PT7' are within the painting range 51, so the device 31 proceeds to step SP32. This applies also to the case shown in FIG. 23, and it proceeds to step SP32.

In step SP32, the device 31 examines whether the target track points have been correctly selected and that the current separation distance R between the tip of the paint gun 2 and the target track points is less than a given separation distance $\Delta R$. In this embodiment, $\Delta R$ is 100 mm. The processing in step SP32 is carried out to prevent a unsteady motion of robot 1 for small separation distance R caused by the data correction device 31 hunting for the target track points to correct the coordinates of the target track points. In the examples shown in FIGS. 22 and 23, the current separation distance R which is between the current position of the gun tip and the target track point PT6 is 300 mm, which is larger than $\Delta R$, therefore, the device 31 proceeds to step SP33.

In step SP33, each of the coordinates of the selected track points is corrected to the coordinates of the temporary positional data. This means that in FIG. 22, the coordinates of the selected track points PT2, PT3, PT6 and PT7 are all corrected to those for PT2', PT3', PT6' and PT7', and in FIG. 23, the coordinates of the selected track points PT1~PT8 are corrected to those for the temporary track points PT1'~PT8'.

If, on the other hand in step SP30, the value of the flag FLAG=2, then the device 31 proceeds to step SP34.

In step SP34, the device 31 examines whether the temporary spray volume obtained earlier is less than the maximum spray volume. If the decision is YES, the device 31 proceeds to step SP35. In step SP35, the spray volume is adjusted to the target spray volume.

On the other hand in step SF30, if the flag FLAG=3, the device 31 proceeds to step SP36.

In step SP36, the device 31 examines whether the temporary speed obtained earlier is below the maximum capable moving speed of robot 1. If the decision is YES, the device 31 proceeds to step SP37 to adjust the painting speed to the target painting speed.

The above set of steps complete all the processing steps prescribed for the data correction device 36 to correct the current parameters to the target parameters.

It is to be noted that as long as some combination of the input keys 41 are pressed by the operator, the timer 37 generates pulse signals every 10 ms, and the data correction device 36 performs the tasks specified by the keys 41 to correct the corresponding teaching data.

Further, the Embodiment 3 presented cases of moving the teaching data, in real-time, along the X-axis in positive or negative direction, but it will be obvious that selected track points can be moved equally easily in other axial directions, Y- or Z-axis.

Further, in Embodiment 3, a linearly aligned track points, PT2, PT3, PT6 and PT7 were chosen to be moved as set of track points, but it is possible to move a single track point, in real-time, by providing other types of input keys on the teaching pendant 5', for example, a "point" setting key or a "pass" setting key, and combining the "point" or "pass" key with the "X" and the "+" or "−" key to move the current point or pass to the corrected coordinates of the target track point or pass.

It is also possible to arrange so that the above point or pass setting key is combined with the "spray" key or the "speed" key together with "+" or "−" key to adjust, in real-time, the spray volume or the speed at any one track point.

Further, it would be obvious that in addition to the paint volume and painting speed that were corrected in Embodiment 3, other painting conditions, such as the overspray width w may also be adjusted in real-time.

It should be noted that the operator is able freely to set and adjust the distance correction $\Delta x$, spray volume correction $\Delta S$, painting speed correction $\Delta V$ and separation distance correction $\Delta R$ between the gun tip and the selected track point.

Further, it should be noted the time interval of the timer 37 for generating pulse signals supplied to the computation device 31 and the data correction device 36 can be adjusted to any desired value other than 1 ms and 10 ms which were used in the embodiments.

It should further be noted that the controller 4' was used to control a painting robot, but it is obvious that the controller 4' can be used for other like functions as welding and assembling.

It should be noted also that the corner points A~D of the metal screen 50 was used in the four-point method in Embodiment 3, but it is clear that any points on a perimeter of the metal screen 50 can be used to define the four points.

It should be noted also that Embodiment 3 presented a case of programming of teaching points according to the four-point method, however, the methodology for teaching data correction developed in the present invention can be applied equally effectively to teaching data prepared by other teaching methods, such as point-to-point method or continuous pass method.

What is claimed is:

1. In a robot control apparatus for controlling a robot which performs work using a work tool on a workpiece disposed on a work platform, an improvement comprising:

memory means for storing a plurality of coordinate data for defining teaching points arranged within a capacity range of movement of said work tool;

track points data computation means for computing a plurality of track points based on said coordinate data surrounding a work range;

correction data computations means for computing values of distance corrections, when corrections in track point data are requested, by calculating a difference in distance between a current track point as computed by the track points data computation means and a target track point, and memorizing said difference as correction data in said memory means; and target track point data computation means for computing target track point data by adding said correction data to current track point data.

2. A robot control apparatus as claimed in claim 1, wherein said work range has approximately a rectangular shape; and when the four corners of the rectangular shape are taught to said robot control apparatus and a number of passes corresponding to a number of passes of said robot over said workpiece are input to said robot control apparatus, said plurality of teaching points are the four corners of the rectangular shape and the corners of rectangles formed by equally dividing the rectangular shape by said number of passes along a single direction.

3. A robot control apparatus as claimed in claim 1, wherein said correction data computation means store each of said correction data together with an identity number assigned to said target track point in memory means, and said target track point data computation means correct a track point specified by said identity number with correction data matching said identity number.

4. A robot control apparatus comprising:

teaching data generation means for generating teaching data for a robotic means;

memory means for storing said teaching data;

control means for controlling motions of said robotic means based on said teaching data;

instruction means for instructing corrections for said teaching data; and teaching data correction means for correcting said teaching data stored in said memory means while said control means control motions of said robotic means based on instructions generated by said instruction means.

5. A robot control apparatus as claimed in claim 4, wherein said control means control said robotic means so that a specific component of said robotic means successively moves through a plurality of track defining points defined by coordinate points in a specified order; said instruction means specifies a current track point and a target track point; and said teaching data correction means alter coordinate data of said current track point to coordinate data of said target track point while said control means control motions of said robotic means.

6. A robot control apparatus as claimed in claim 4, wherein said instruction means specify a moving speed of a specific component of said robotic means, said teaching data correction means correct said moving speed based on instruction data generated by said instruction means while said control means control motions of said robotic means.

7. A robot control apparatus as claimed in claim 4, wherein said instruction means specify a quantity of a task performed by said robotic means, said teaching data correction means correct said quantity of said task based on said instruction data while said control means control motions of said robotic means.

8. A robot control apparatus as claimed in one of claims 5 to 7, wherein:

said teaching data comprise coordinate data for each of said track defining points, said moving speed when said specific component of said robotic means is passing said track defining point, and said quantity of a task when said specific component of said robotic means is passing said track defining point;

said instruction means specify at least one of (a) said plurality of track defining points, and corrected values of the coordinate data for each of said track defining points, (b) the moving speed at said track defining point, and (c) the quantity of a task at said track defining point; and said teaching data correction means simultaneously alter (a) said coordinate data, (b) said moving speed or (c) said quantity of work to said corrected values specified by said instruction means for each of said plurality of track defining points.

9. In a robot control apparatus for controlling a robot which performs work using a work tool on a workpiece disposed on a work platform, an improvement comprising:

memory means for storing a plurality of coordinate data for defining teaching points arranged within a capacity range of movement of said work tool;

track points data computation means for computing a plurality of track points based on said coordinate data surrounding a work range;

correction data computation means for computing values of distance corrections, when corrections in track point data are requested, by calculating a difference in distance between a current track point as computed by the track points data computation means and a target track point, and memorizing said difference as correction data in said memory means; and target track point data computation means for computing target track point data by subtracting said correction data from said current track point data.

10. A robot control apparatus as claimed in claim 9, wherein said work range has approximately a rectangular shape; and when the four corners of the rectangular shape are taught to said robot control apparatus and a number of passes corresponding to a number of passes of said robot over said workpiece are input to said robot control apparatus, said plurality of teaching points are the four corners of the rectangular shape and the corners of rectangles formed by equally dividing the rectangular shape by said number of passes along a single direction.

11. An apparatus as in claim 9, wherein said correction data computation means store each of said correction data together with an identity number assigned to said target track point in said memory means, and said target track point data computation means correct a track point specified by said identity number with correction data matching said identity number.

* * * * *